United States Patent [19]
Taylor

[11] Patent Number: 5,249,157
[45] Date of Patent: Sep. 28, 1993

[54] COLLISION AVOIDANCE SYSTEM

[75] Inventor: William H. Taylor, South Deerfield, Mass.

[73] Assignee: Kollmorgen Corporation, Northampton, Mass.

[21] Appl. No.: 571,131

[22] Filed: Aug. 22, 1990

[51] Int. Cl.$^5$ ............................ G08G 1/16; B60Q 1/00
[52] U.S. Cl. .................................... 340/903; 340/435; 340/556; 340/961; 342/107; 356/3; 358/108; 358/110; 358/113
[58] Field of Search ............... 340/903, 435, 436, 961, 340/555, 556, 904, 559; 342/29, 41, 70, 95, 96, 107, 417, 419, 450, 455; 356/3, 4, 1, 2, 17; 358/107, 108, 103, 125, 110, 113, 105; 180/167, 169, 170; 364/460, 461, 426; 250/221

[56] References Cited

U.S. PATENT DOCUMENTS

| | | | |
|---|---|---|---|
| 4,026,654 | 5/1977 | Beaurain | 340/903 |
| 4,538,181 | 8/1985 | Taylor | 358/208 |
| 4,621,705 | 11/1986 | Etoh | 340/904 |
| 4,626,850 | 12/1986 | Chey | 340/903 |
| 4,757,450 | 7/1988 | Etoh | 340/904 |
| 4,833,469 | 5/1989 | David | 340/903 |
| 4,849,731 | 7/1989 | Melocik | 340/903 |
| 4,926,170 | 5/1990 | Beggs et al. | 340/903 |
| 5,039,217 | 8/1991 | Maedawa et al. | 340/904 |

FOREIGN PATENT DOCUMENTS 2044035A 10/1980 United Kingdom .
2071957A 9/1981 United Kingdom .

OTHER PUBLICATIONS

"Taking the Crush Out of Rush Hour" High Technology Business, Mar. 1989, pp. 26-30.
"Laser Ranging Device Keeps Cars Apart" Arndt, Photonics Spectra, Jul. 1990, pp. 133-134.
Proposal-Center for Intelligent Highway Systems and Autonomous Vehicles, Texas Transportation Inst. Aug. 1990.

Primary Examiner—Donnie L. Crosland

[57] ABSTRACT

A collision avoidance system particularly suited for automotive applications includes an electro-optical rangefinder scanner, retroreflectors on target vehicles, and a processing unit. The rangefinder supplies data on the range and angle of target vehicles to the processor, which monitors each target vehicle's position, speed and acceleration and constantly determines and updates target range, angle, velocity, acceleration and predicted separation distances. A warning signal or evasive manuever instructions are issued if the predicted separation at the time of intercept is below a minimum acceptable value.

51 Claims, 12 Drawing Sheets

TIME (SECONDS)

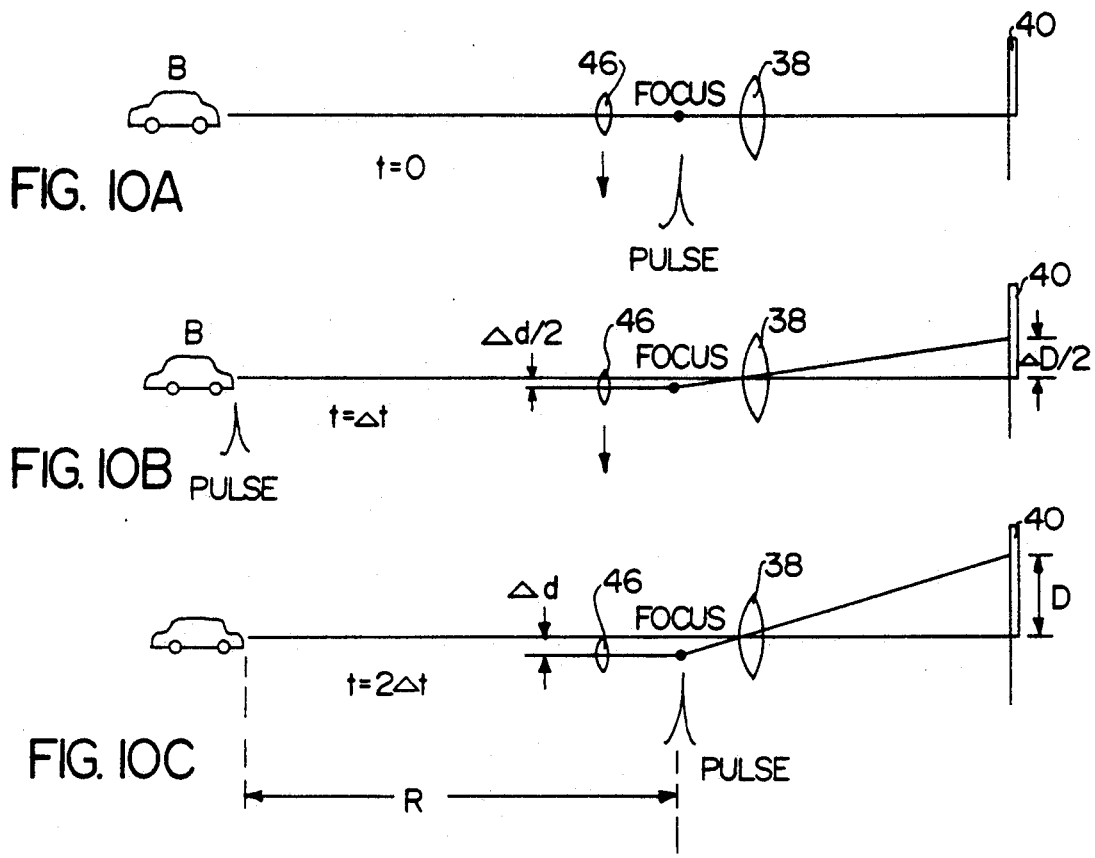
FIG. 10A
FIG. 10B
FIG. 10C
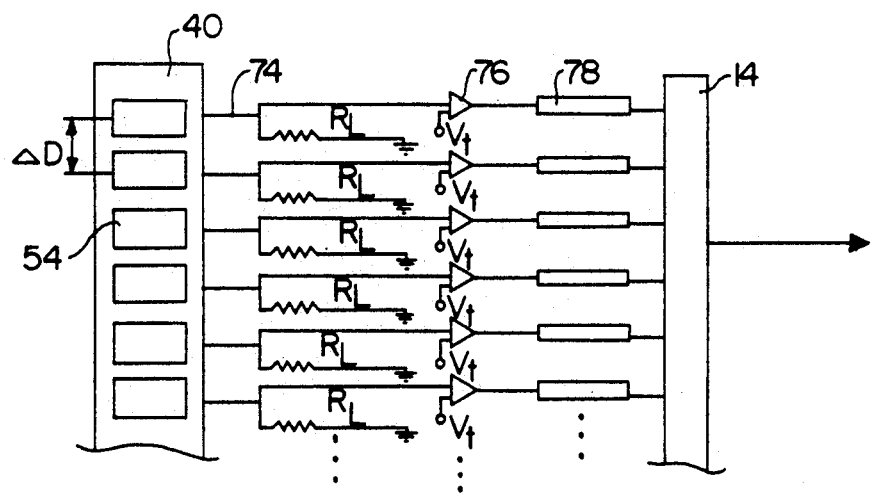
FIG. 11

COLLISION AVOIDANCE SYSTEM

TECHNICAL FIELD

The present invention relates to a system for avoiding collisions between vehicles, particularly automobiles.

BACKGROUND AND OBJECTS OF THE INVENTION

1. Background of the Invention

Automobile accidents each year result in thousands of fatalities and injuries and cause millions of dollars in property damage. Collisions occur as a result of operator inattentiveness, incompetence, errors in judgement etc. Operator reaction time also plays a part in determining whether a potential collision, once detected, can be avoided. Collisions occur in a number of ways, e.g., rear-end, head-on, broadside, and under a variety of road and terrain conditions, such as two vehicles travelling in opposite directions on parallel paths, two vehicles travelling in the same direction on the same path, around a curve, through a dip or over a crest, at right, oblique or acute angle intersections. Collisions occur on lightly travelled country roads, densely populated highways or city streets, and under all types of weather and lighting conditions, ranging from well lit highways in clear weather to unlit back roads in foul weather.

In order to be effective, an automotive collision avoidance system must operate under all of the foregoing conditions with a high degree of accuracy and reliability. The system must identify and track the location, direction and speed of every other vehicle and be able to signal the operator or the vehicle controls when collision is imminent. The system should also be small and lightweight and should not detract from or interfere with vehicle styling. The system should not issue false alarm signals, even in cluttered environments, should work in the presence of similarly equipped vehicles and should not interfere with the safety or rights of the other motorists, pedestrians or inhabitants of the area in which the vehicle will operate.

2. Prior Art

Automotive traffic control and collision avoidance systems have been proposed. See "Taking the Crush Out of Rush Hour", High Technology Business, March, 1989, pages 26–30; and "Laser Ranging Device Keeps Cars Apart", Winfried Arndt, Photonics Spectra, July 1990, pages 133–134. The proposed systems typically involve radar tracking systems which provide range information by measuring the time delay between transmission of a radio frequency pulse and detection of the pulse reflected from a distant object. Some radar systems are also capable of determining vehicle velocity using the doppler principle. However, radar systems suffer from a lack of good spatial resolution, and require a large antenna to obtain good resolution. For example, at 35 GHz, an antenna size of 1188 millimeters would be required to obtain one degree beam resolution. Using millimeter wave radar at 94 GHz can improve the antenna size, but still requires a 372 millimeter antenna. In either case, the antenna size is inappropriate for automotive implementation without compromising body styling and aerodynamics.

Moreover, while one degree resolution may be adequate for aeronautical applications, such resolution is inadequate for a universally effective and reliable collision avoidance system. Such systems, it will be seen herein, call for a narrow beam resolution of about ¼ of one degree with a rapid slew rate of over 300,000 times per second over a 60°×6° field. Such requirements make traditional radar systems impractical for automotive applications.

Laser radar systems are also known, and eliminate the problem of large beam widths by providing a beam having a much shorter wavelength on the order of about 1.0 micrometers. Beam spreads on the order of a few milliradians are possible, but heretofore known laser rangefinder systems employ very high peak power in the transmitted pulses, on the order of 10 megawatts or more. Repetition rates of 1–20 Hz are obtainable with lasers, but such lasers usually must be water cooled to prevent overheating. The power and cooling requirements of these lasers make them impractical for automotive application. In addition, repetition rates on the order of several hundred thousand are necessary under the more stringent collision avoidance applications, which require very high repetition rates, a wide field of view and high spatial resolution. Another problem with some laser rangefinder systems is that the laser beams generally are not eyesafe and may cause eye injury to pedestrains or other motorists.

Aeronautical collision avoidance systems based on beacon tracking are also known. Such systems generally are beacon systems which involve aircraft mounted transmitters and receivers. A transmitter on one aircraft transmits position, direction and velocity information for that aircraft. A nearby aircraft receives the transmitted information and processes the information in conjunction with the corresponding information for the receiving aircraft to determine whether a collision is likely. As will be appreciated, a beacon system requires that both aircraft be equipped with a transmitter, receiver and electronic equipment capable of determining and processing position, direction and velocity information relative to a reference frame common to all aircraft. The accuracy of the system depends upon the accuracy of the information transmitted and processed. Beacon systems are not well suited for automotive applications due to (i) lack of a convenient common reference frame; (ii) expense of equiping all automobiles with the required equipment; (iii) ineffectiveness of the system with respect to automobiles not equipped with the beacon system.

In sum, existing systems suffer from various deficiencies including large size, low scan rate, eye safety, expense, etc.

With regard to motor vehicles, there has also been discussion of vehicle control systems integrated into highways. Such systems typically call for roads provided with electronic guides, superconducting magnets etc. Needless to say, such proposals are extremely expensive from the standpoint of development and implementation, and would only be operative in localities where substantial capital equipment has been integrated into the roadway and automobile.

3. Objects of the Invention

It is therefore an object of the present invention to provide a collision avoidance system.

It is a further object of the invention to provide a collision avoidance system which is compact and readily may be implemented into an automobile.

Another object of the invention is to provide a rangefinder scanner which, among other things, is suitable for use in a collision avoidance system.

Another object of the invention is to provide a collision avoidance system which is capable of distinguishing among and tracking numerous potential collision targets.

Yet another object of the invention is to provide a collision avoidance system which is operable under a wide variety of road and weather conditions.

A still further object of the invention is to provide a collision avoidance system processor which utilizes a single target analysis procedure regardless of the potential collision geometry.

These and other objects and advantages are accomplished in a compact collision avoidance system which may be mounted to an automobile without detracting from or interfering with vehicle styling, and which identifies and tracks potential collision targets electro-optically under a variety of weather and road conditions. While the present invention will be discussed with specific reference to the problem of collision avoidance in automotive applications, it is contemplated that the electro-optical collision avoidance system of the present invention may find application to other fields, albeit with modifications to the operating range, resolution, etc.

SUMMARY OF THE INVENTION

In accordance with the invention, an electro-optical rangefinder is provided which operates at a high scan rate, on the order of 300,000 pixels/second and frame rate on the order of 60 Hertz, with a wide field of view to identify potential collision targets and provide range and angle data as to each such vehicle. Range and angle data is processed by a computer in conjunction with prior frames of data to track potential collision targets and determine and monitor the velocity and acceleration of such other vehicles. Most importantly, the system in accordance with the invention calculates the time to intercept and predicts the lateral separation or "miss distance" between the subject vehicle and each potential collision target at their respective times of intercept. The range and angle data is continuously updated and the determination of predicted separation distance is repeated continuously in order to assure consistent results, a high degree of prediction accuracy, and few false alarms.

The rangefinder is an electro-optical scanning system which transmits light pulses to all pixels in the field of view and receives and detects returned signals in such a manner that range and angle information is obtained. The preferred system includes a framing mirror, a primary or focusing mirror, a strip mirror, a rotating scanning disc having concave reflectors on a surface thereof, and collection and relay optics which focus the scanned image onto a detector array. The system also includes a light source, such as a laser diode, to transmit ranging light pulses. Generally speaking, the scanner receives light from the scene to be scanned, and the framing mirror scans the scene line by line in the vertical direction. The image from framing mirror is focused by the primary mirror onto a strip mirror, which reflects at least one line of the image at a time toward the concave reflectors on the scanning disc. The strip mirror is disposed along an arc which corresponds to the arc defined by the focal points of the disc reflectors, so that the rotating scanning disc performs a pixel by pixel horizontal scan across each line scanned by the framing mirror. Needless to say the scanning disc rotates at high speed, considerably higher than the oscillation rate of the framing mirror, with the scanning rates of the framing mirror and disc preferably combining to give a frame scanning rate of about 60 cycles per second. Because the strip mirror is disposed at the focus of the concave reflectors on the disc, the image reflected from the disc reflectors is collimated. The collimated image is focused via a relay mirror onto a detector array. The relay mirror greatly lengthens the optical system focal length, thereby creating a finite, measurable displacement of the return light spot at the focal plane of the detector as a result of the disc rotation that occurs during the time between the transmitted and received pulse.

In the rangefinder of the present invention, the laser diode emits a short duration, i.e. 20 nanosecond, light pulse which is reflected via a transmission mirror, at least one concave reflector on the scanning disc, the strip mirror, the primary mirror and framing mirror to be transmitted to a pixel in the field of view. The ranging pulse is reflected from a vehicle back to the subject vehicle. Upon return of the relected signal, the reflected pulse is focussed onto the detector array and is detected. Because the scanning disc rotates at a constant speed, the rotational distance of travel of the rotating scanning disc during the elapsed time required for the transmitted pulse to reach the target vehicle, be reflected and return is directly proportional to the range of the target vehicle. The target angle is known from the position of the corresponding pixel in the scanned field, i.e. the time lapse between the start of the frame scan and the particular pixel being scanned.

The optical rangefinder provides range and angle data to a processor. The processor tracks the range and angle of all potential target vehicles in the field of view and, based on a multiple frame scans, determines the velocity and acceleration or deceleration of each vehicle in range, aximuth and elevation. Most importantly, the processor calculates the time to intercept then, based on multiple frames of data and the relative direction, speed and acceleration, if any, of the subject vehicle to which the scanner is mounted and the target vehicle, predicts the separation or miss distance of each target vehicle at the time of intercept. Advantageously, and very importantly, the system includes retroreflectors disposed on all target vehicles which permit the system to distinguish between targets and myriad unwanted surrounding objects or "clutter." The elimination of the clutter problem by this technique simplifies enormously the signal processing task and problem of false alarms. This system attribute gives the system another considerable advantage over convential radar systems. Rangefinder ambiguities are eliminated with a staggered overscan of each row of pixels to allow longer elapsed time to detect a return signal, and also by threshold filtering or detector compensation. Equalization filters also are contemplated to reduce the wide variation in reflected signal strength depending upon target distance.

Advantageously, the electro-optical rangefinder scanner is compact and lightweight and does not require a bulky antenna having a specific configuration. Therefore, the rangefinder is well suited for automotive implementation. Similarly, the processor portion of the system is compact and may be constructed in and "on-board" configuration. Because of the high reflection efficiency of the retroreflectors of the invention and the limited range of operation, a relatively low power laser diode transmitter may be used, thereby further reducing the size and power requirements of the system and assuring the safety of surrounding pedestrians and motorists. Further, the wavelength of the rangefinder beam is selected so that inclement weather does not significantly affect the operation or accuracy of the system, and eye safety of pedestrians and motorists is assured. By way of example only, the rangefinder might operate in the visual, infrared or near infrared portions of the electromagnetic spectrum.

The collision avoidance system of the present invention provides very accurate range and angle information which is translated into highly accurate prediction of vehicle separation at the time of intercept.

Therefore, it will be appreciated that the objects of the invention have been accomplished. Thus, the system provides a lightweight, compact collision avoidance system including an electro-optical rangefinder which readily may be implemented in automotive applications without compromising styling or safety. Indeed, the rangefinder may be mounted out of sight under the hood behind the front grill of a vehicle, with the processing unit mounted nearby or elsewhere in the vehicle. Because all processing may be accomplished with compact microcircuitry the system processor also may be conveniently mounted on the vehicle.

As used herein, the term "light" should not be construed to be restricted to wavelengths within the visible range of the electromagnetic spectrum, but rather should be construed to cover any operable wavelength and/or frequency within the electromagnetic spectrum consistent with the resolution requirements of the particular system. The 1.5 micrometer wavelength region is a preferred one because it satisfies the eye safe requirement while permitting the use of laser diodes which can operate at the high rates required by the transmitter. These have reached maturity in the fiber optics data communications field where yet higher data rates are found.

The foregoing general description and the following detailed description as well are exemplary and explanatory of the invention, and are not restrictive thereof.

BRIEF DESCRIPTION OF THE DRAWINGS

The manner in which the invention is achieved can be best understood with reference to the accompanying drawings which form a part of this specification, in which:

FIGS. 10A through 10C are elevation views at different times illustrating the principle of operation of the rangefinder scanner in accordance with the invention;

FIG. 11 is a plan view of one detector circuitry arrangement;

Detailed Description of the Preferred Embodiments

Figure 1:
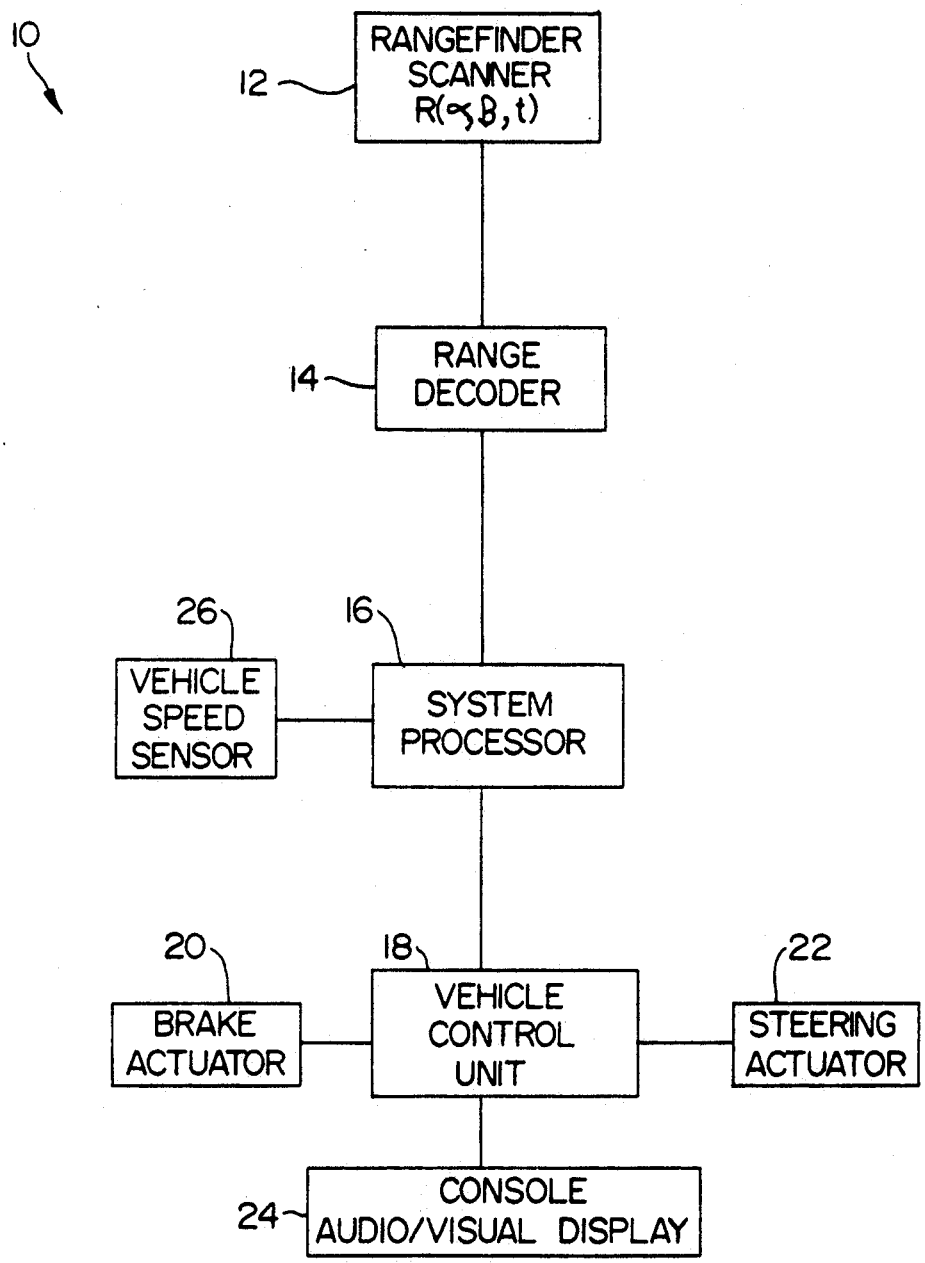
FIG. 1 is a block diagram illustration of the collision avoidance system in accordance with the invention.

Referring now to the drawings, a collision avoidance system 10 includes a rangefinder scanner 12, a range decoder 14, and a system processor 16 connected to a vehicle control unit 18 which, in turn, is connected to and can control a brake actuator 20, a steering actuator 22 and a console display 24. The procesor 16 also receives speed data for the associated vehicle from a speed sensor 26. Rangefinder scanner 12 has a receiving channel comprised of a framing mirror 28, a primary mirror 30, a strip mirror 32, a scanning disc 34, a collection optic 36, a relay mirror 38 and a detector array 40. The rangefinder also includes a transmission channel which shares the foregoing optical system but which further includes a pulse transmitter 42 and a transmission mirror section 44 which collimates light emitted from the transmitter. The scanner operation is as follows. The scene is scanned in one direction by framing mirror 28, with primary mirror 30 focusing one scan line at a time onto strip mirror 32. Rotating scanning disc 34 has a plurality of concave reflectors 46 arranged in an arc to conduct a pixel by pixel scan of the linear image from the strip mirror. Collection optic 36 focuses the scanned image, via relay optic 38, onto the linear detector array 40. Ranging light pulses transmitted by transmitter 42 are reflected from transmission mirror 44 to the concave reflectors on the scanning disc, the strip mirror, the primary mirror and the framing mirror and on to the scene to be scanned. Rangefinding is performed by activating the transmitter to emit a short duration light pulse via the optical system toward the corresponding pixel in the frame to be ranged. The elapsed time from time zero when the pulse is emitted until the reflected signal is detected is determined from the element in the linear detector array which is activated—the longer the time lapse, the farther along the array the return light spot will fall. The range decoder identifies the target and determines the target range and angle in both azimuth and elevation directions, feeding this data to the collision avoidance system processor. The processor identifies and tracks a number of targets. The processor calculates the rate of change in the range and angle of each target, i.e. velocity, as well as the rate of change of the rates of change, i.e. acceleration or deceleration, and the time to intercept. Based on this information, the system processor predicts the separation distance at the time of intercept and, if necessary, transmits a warning signal and/or collision avoidance instructions to the vehicle control unit so that avoidance manuevers can be implemented.

FIG. 1, shows a functional block diagram of the collision avoidance system in accordance with the invention. The rangefinder scanner scans a scene, preferably with a 60°×6° field of view, and provides range and angle data for every 0.25°×0.25° pixel within the scene. The range decoder reformats the range data, selects targets for tracking, and inputs targets to the tracker. The system processor tracks up to N targets in parallel, calculates angle and range changes and rates of change, and calculates predicted separation distance at the time of intercept. The system processor also outputs commands to the vehicle control unit to effect collision warning and/or avoidance.

The design of the preferred embodiment of the invention is based on a number of reasonable assumptions and estimates, explanation of which will facilitate understanding the invention.

Figure 3A:
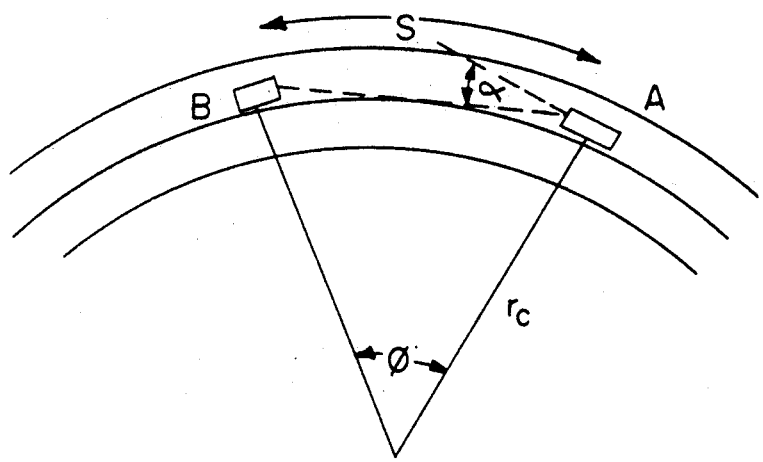
FIG. 3A is a plan view illustrating the geometry of two vehicles on a curved road.
Figure 3B:
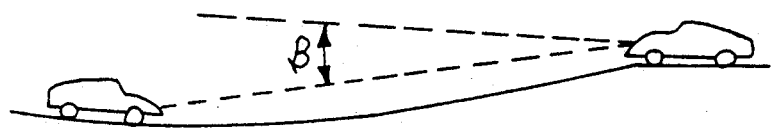
FIG. 3B is an elevation view illustrating the geometry of two vehicles on a hilly road.
Figure 4C:
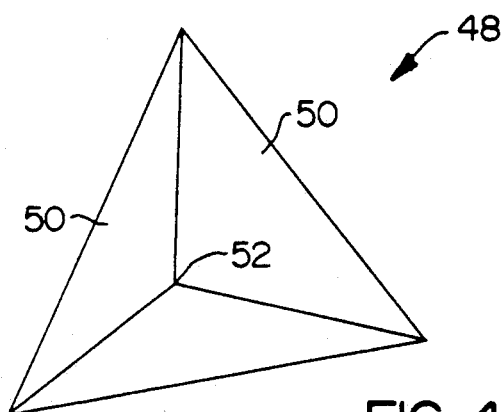
FIG. 4C is a perspective view of a cube corner retroreflector.
Figure 4A:
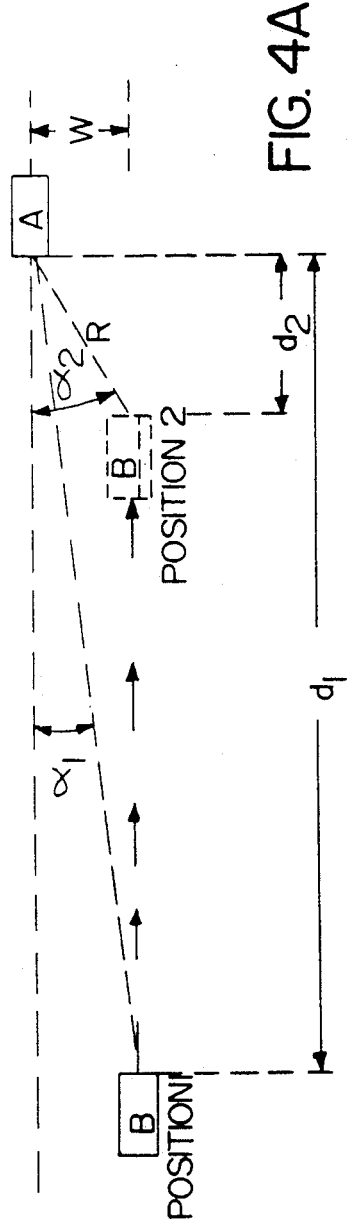
FIG. 4A is a plan view illustrating the geometry of two vehicles approaching each other on a straight road.
Figure 4B:
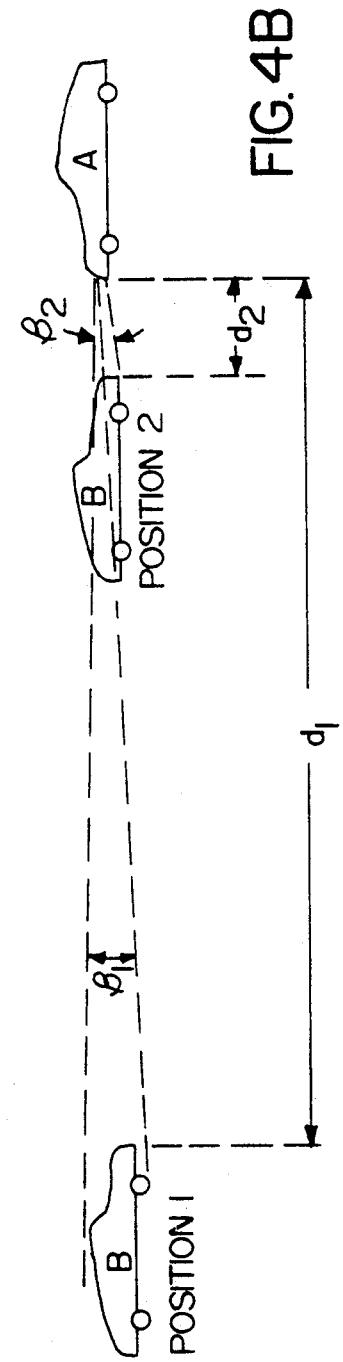
FIG. 4B is an elevation view illustrating the geometry of two vehicles approaching each other on a straight flat road.

As stated, the collision avoidance system must operate to avoid a number of different types of collisions, e.g. rear-end and head-on collisions on straight, curved and hilly roads. FIGS. 3A-3B and 4A-4B are representative af the geometry of these situations. FIG. 3A illustrates two vehicles on a curved road and FIG. 3B shows two vehicles on a hilly road. FIG. 4A illustrates two vehicles travelling in opposite directions on a straight road, and FIG. 4B shows the vertical field of view with regard to distal and proximal positions of two vehicles approaching each other.

Generally speaking, in a rear-end situation on a straight flat road the sensor need only see straight ahead along an axis parallel to the longitudinal axis of the vehicle, and must measure the range of the other vehicle. As illustrated in FIGS. 3A and 3B, however, a curved or hilly road will defeat such a simple system. In order to accomodate such curved road situations, it is necessary to broaden the scanned beam coverage. In addition, FIGS. 3A and 3B suggest that a relatively wide horizontal scanned beam coverage is required for a curved road situation, but that a much narrower scanned beam coverage will suffice in the vertical direction to cover the hilly road situation. Minimizing the breadth of the beam in at least one direction is desirable to avoid clutter and signal processing difficulties. In the curved road situation, the horizontal field of regard is determined by the radius of curvature of the road, $r_c$, and the nearest range requirement. Referring to FIG. 4A, in the straight road situation at close range, i.e. vehicle B, position 2, the horizontal angle $\alpha_2$ at range $d_2$ is greater than the horizontal angle $\alpha_1$ at a greater range of $d_1$. Similarly, the vertical field of regard defined by angle $\beta_2$ is determined by road slope, as shown in FIG. 3B, as well as the nearest range requirement in the vertical direction. As shown in FIG. 4B, at distal position 1 angle $\beta_1$ is relatively large and vehicle B is fully illuminated by the sensor transmitter, whereas at position 2 angle $\beta_2$ is much narrower and vehicle B is only partly illuminated by the sensor transmitter. More complete coverage at position 2 is obtained by broadening the beam coverage in the vertical direction.

It is most important to achieve short range performance since collisions can develop suddenly in a fraction of a second. By way of example, one vehicle might swerve out of its lane into the lane and path of the subject vehicle. If the vehicles are travelling at high speed in opposite directions, there will be little time to react. As will be appreciated from the foregoing discussion, nearest range performance can be equated with a broad field of regard for the sensor system.

For the purpose of the present discussion, a typical field of regard or field of view can be determined based on the parameters and considerations set out in the foregoing discussion. For example, in a highway situation such as illustrated in FIG. 3A, if vehicle B is at rest and vehicle A is travelling at 80 feet per second, i.e. 55 miles per hour, around a curve having a radius of curvature, $r_c$, of 250 feet, the distance travelled, S, is defined by equation 1:

$$S = Vt \tag{1}$$

where V=velocity and t=time. The angle $\phi$ at the center of curvature is defined by equation 2:

$$\phi = \frac{S}{r_c} = \frac{Vt}{rc} \tag{2}$$

The half angle $\alpha$ of the sensor field of view is:

$$\alpha = \frac{\phi}{2} \tag{3}$$

Substituting for $\phi$ from equation (2), $$\alpha = \frac{1}{2} \frac{Vt}{rc} \tag{4}$$

The time rate of change of $\alpha$, designated $\alpha'$, is:

$$\alpha' = \frac{1}{2} \frac{V}{r} \tag{5}$$

Under the conditions described, a reasonable period of time for the vehicle come to a stop is approximately 3 seconds after the brakes are applied. Therefore, the maximum rate change of $\alpha$, designated $\alpha'm$, is:

$$\alpha'm = \frac{\Delta\alpha}{\Delta t} = \frac{1}{2} \frac{80}{250} = .16 \text{ radians per second} \tag{6}$$

and the average $\alpha'$, i.e. $\alpha'$ave. is one half $\alpha'm$, or $\frac{1}{2} \times 0.16 = 0.08$ radians/sec., and $$\Delta\alpha = \alpha'\text{ave.} \times \Delta t \qquad (7)$$
$$= (.08 \text{ radians per sec.}) \times 3 \text{ sec.}$$
$$= .24 \text{ radians}$$
$$= 13.75°$$

This is the sensor half field angle required to detect vehicle B at rest in the lane of travel early enough to institute steps to avoid collision.

For two cars approaching each other (see FIG. 4A) at high speed, such as 90 feet per second (60 mph), the closing velocity is 180 feet per second. Assuming a shortened acceptable reaction time of 0.2 seconds to swerve, and that the center to center separation distance of the vehicles, W, is ten feet, $$\alpha 2 = \frac{W}{d_2} = \frac{10}{180 \times .2} = .28 \qquad (8)$$

If 0.1 second reaction time is sufficient, then $\alpha$ is 0.56 radians or 32°.

Based on the foregoing, an acceptable sensor half angle appears to be in the range of 0.25 to 0.50 radians or 15° to 30°, with a full field of view on the order of about 30° to 60°. In the vertical direction, similar analysis results in a field of view between 5° degrees and 10°. For the purposes of further discussion a sensor field of view of 60°×6° is assumed, in order to achieve an appropriate balance between field coverage and data rate. It will be understood, however, that this assumption is for purposes of illustration and explanation only, and that a different field of view may suffice or be preferred depending upon the particular circumstances.

Within the sensor field of view there will be both vehicles, the principal objects of the collision avoidance system, as well as many false targets, e.g. terrain, etc. One effective way to distinguish between the two is equip all vehicles with a device which will identify the vehicle as an object of collision avoidance. In the present invention, this is accomplished by incorporating retroreflectors in the head, tail, parking and side marker light assemblies of all vehicles. The retroreflectors return transmitted radiation to the sensor with high reflection efficiency so that the vehicle reflector appears to be a very bright reflector. Background reflections from surrounding terrain are feeble in comparison, i.e. they appear to be dim targets, and such false signals are simply eliminated by setting the receiver signal threshold to an appropriate level above the dim reflections but well below the bright target reflections, as explained in greater detail below. It is contemplated that existing automobile reflectors may have sufficient reflectivity to act as the retroreflectors of the present invention. It is also contemplated, however, that it may be necessary or desirable to provide retroreflectors having higher reflectivity, such as a cube corner retroreflector or a series of small cube corner retroreflectors. FIG. 4C illustrates a cube corner reflector 48 having three perpendicular flat surfaces 50 arranged to define a corner 52, thereby providing high retroreflector efficiency. As will be appreciated, a plurality of miniature cube corner retroreflectors of the type shown in FIG. 4C may be aligned side to side to provide a highly efficient 180° retroreflector. It is also contemplated that retroreflective paint strips may suffice.

Figure 5:
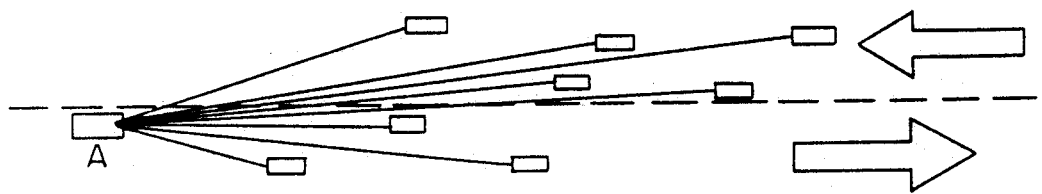
FIG. 5 is a plan view illustrating a likely field of targets in a highway situation.

A further requirement of the system is to be able to distinguish between all the targets within the field of view. This performance parameter is a function of the spatial resolution of the sensor system. Referring now to FIG. 5, a typical field of targets for a multiple lane highway is illustrated. Distinguishing between the target vehicles is a function of angular resolution, which in turn depends upon the desired system operating distances. As previously discussed, the system operating distance is a function of the time required to decelerate from highway speed, e.g. about 3 seconds. Adding several seconds to this minimum reaction time to allow time for identifying and tracking targets, and assuming a closing velocity of 180 feet per second, the target acquisition range is about 6 second×180 feet per second, or 1080 feet. For a vehicle width of 5.5 feet, the angular resolution required to distinguish between vehicles at a range, R, of 1080 feet is:

$$\Delta\theta = \frac{W}{R} \qquad (9)$$
$$= \frac{5.5}{1080}$$
$$= 5.5 \text{ milliradians}$$

This is approximately 0.30°. To provide a further comfort level and allow for clear separation, 0.25° is a reasonable hypothetical value for angular resolution $\Delta\theta$ to be used in calculations.

Based on the foregoing reasonable assumptions and estimates, the collision avoidance system should have a field of view half angle of about 30° in the horizontal direction, with 0.25° angular resolution.

In order to construct a three dimensional map of the target space, it is necessary to know the range of each potential target within the field of view relative to the sensor. The number of resolution cells within the half field is:

$$\frac{30° \times 6°}{.25°^2} = 2880$$

For each resolution cell there is a potential range, with all range values constituting a "frame" of information. The accuracy of the range is established as follows. Referring to FIG. 4A, the separation W between vehicles "A" and "B" equals:

$$W = R \sin \alpha \qquad (10).$$

The range resolution determines the separation resolution. That is, the range uncertainty, expressed as $\Delta R$, determines the separation distance uncertainty $\Delta W$ as follows:

$$\Delta W = \Delta R \sin\alpha \qquad (11)$$
$$\approx \Delta R \alpha$$

If the maximum acceptable uncertainty in the separation distance is 2.5 feet under most circumstances, then:

$$\Delta R_{max.} = \frac{\Delta W_{max.}}{\alpha} \qquad (12)$$
$$= \frac{2.5 \text{ feet}}{.25 \text{ radians}} = 10 \text{ feet}$$

Thus, ten feet would be the maximum permissible range uncertainty. Under most circumstances, however, the uncertainty would be much less. For example, at a distance of 100 feet and a nominal separation W of 10 feet, $\alpha = 0.1$ and $\Delta W = 10$ feet $\times (0.1) = 1$ foot. In further discussion a range resolution of 10 feet will be assumed.

The separation distance and, more particularly, the predicted separation distance at the time of intercept, is the critical parameter in avoiding collision. Separation distance is determined from range and angle information. As demonstrated below, range and separation distance change very rapidly under some circumstances, so it is important that the system continually receive and update information as to these variables.

Figure 6:
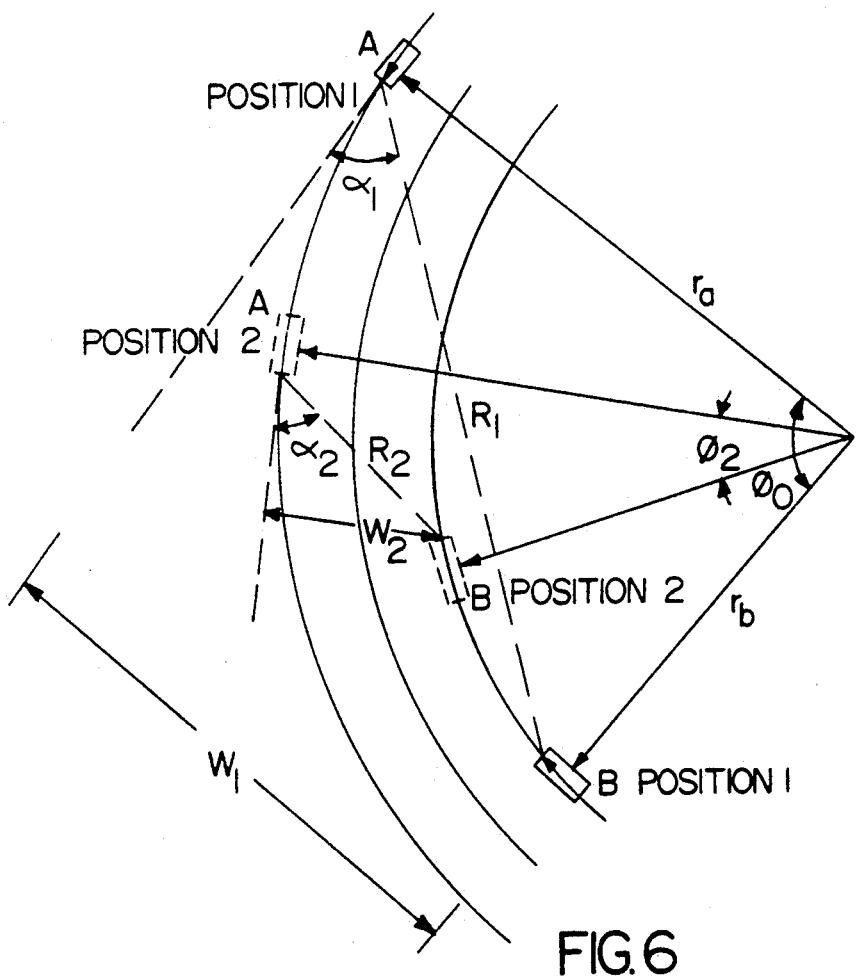
FIG. 6 is a plan view illustrating the geometry of a potential collision situation on a curved road.
Figure 7A:
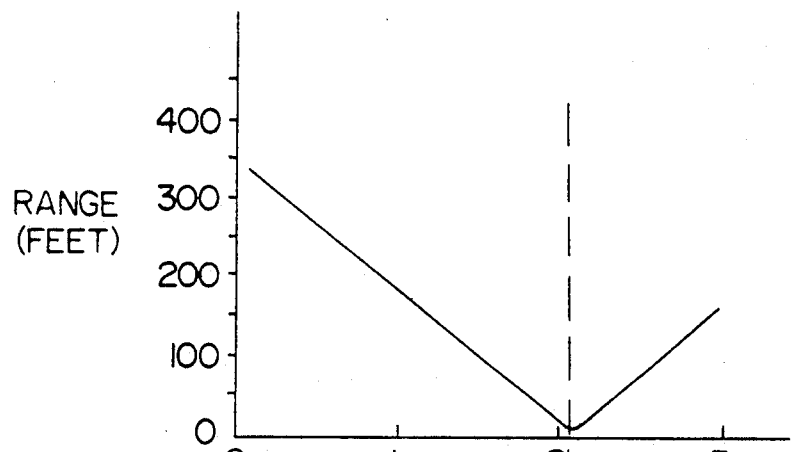
FIGS. 7A through 7C are graphs illustrating a possible sequence of events in the situation illustrated in FIG. 6.
Figure 7B:
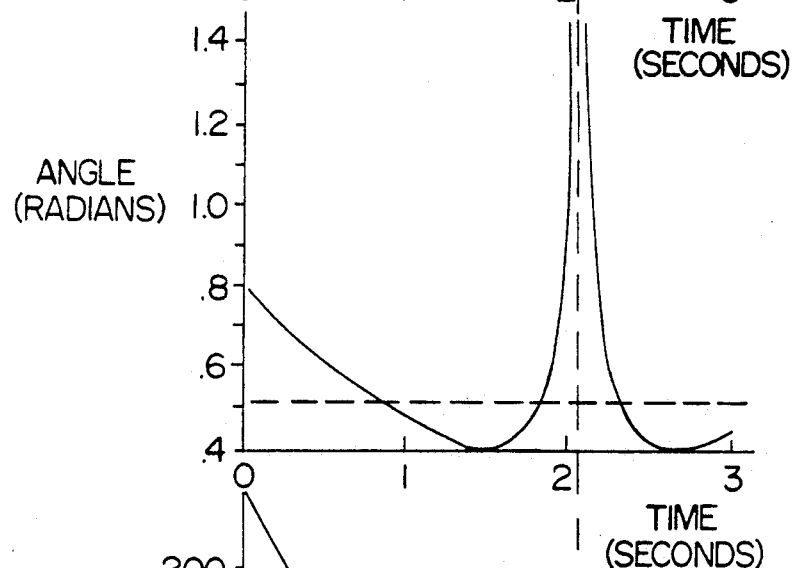
Figure 7C:
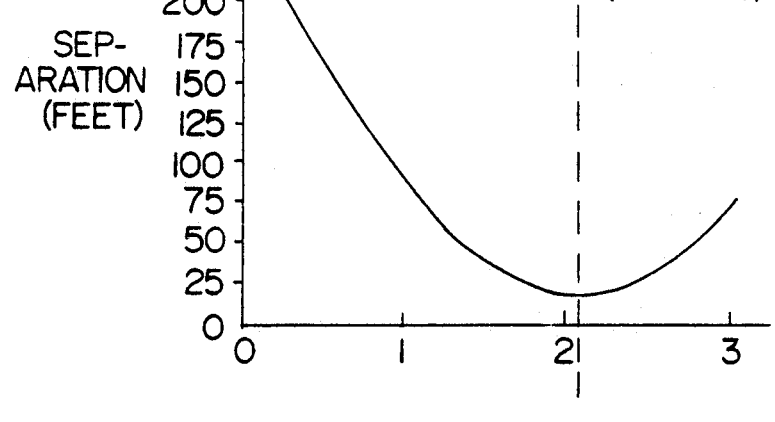

Referring to FIG. 6, the rates of change of the range and angle are demonstrated with reference to two positions of two vehicles A and B travelling in opposite directions around a curve in their respective lanes. Applying the law of cosines to the geometry of FIG. 6, the range between the vehicles is given by:

$$R = \sqrt{r_a^2 + r_b^2 - 2r_a r_b \cos\left[\phi_o - t\left(\frac{V_a}{r_a} + \frac{V_b}{r_b}\right)\right]} \quad (13)$$

where $r_a$, $r_b$ are the radii of the road curvature for vehicles A and B, $\phi_o$ is the angle separating the vehicles at position 1, $V_a$ and $V_b$ are the velocities of vehicles A and B and t is the time elapsed from any position 1 to any new position, i.e. position 2. The angle $\alpha$ is given by:

$$\alpha = \sin^{-1}[(r_b^2 - R^2 - r_a^2)/(-2r_a R)] \quad (14)$$

where R is first determined from equation (13) above. The separation may then be calculated using formula (10), i.e. $W = R \sin \alpha$. Assuming $r_a = 260$ feet, $r_b = 240$ feet, $V_a$ and $V_b$ equal 90 feet per second, and $\phi_o = 1.5$ radians or approximately 90 degrees, typical values for the range R, angle $\alpha$ and separation distance W as a function of time t are tabulated and are listed in Table I and plotted in FIGS. 7A through 7C. The vehicles pass at a separation of 20 feet.

TABLE I

| Time (sec.) | Range (feet) | Angle (rad.) | Separation (feet) |
|---|---|---|---|
| 0 | 341 | .793 | 243 |
| .2 | 314 | .728 | 209 |
| .4 | 285 | .663 | 176 |
| .6 | 255 | .601 | 144 |
| .8 | 223 | .542 | 115 |
| 1.0 | 191 | .487 | 89 |
| 1.2 | 157 | .439 | 67 |
| 1.4 | 123 | .404 | 48 |
| 1.6 | 88 | .398 | 34 |
| 1.8 | 54 | .477 | 25 |
| 2.0 | 25 | .975 | 20 |
| 2.2 | 29 | .789 | 21 |
| 2.4 | 61 | .448 | 26 |
| 2.6 | 95 | .395 | 37 |
| 2.8 | 130 | .409 | 52 |
| 3.0 | 164 | .447 | 71 |

The foregoing data and plots show that an entire collision avoidance scenario can be quite brief, ocurring in an elapsed time of less than about 2 seconds. The foregoing illustration also assumes a 60° sensor field of view. The example shown above is an severe case, but nonetheless a common one which provides a strong argument for a 60° full field of view. Indeed, in this severe case first detection would not occur with a system having a 30° full field of view.

Continuing with the foregoing example, in the elapsed time interval of under 2 seconds the system must gather and process target data and transmit warning or control signals to the driver and/or steering and braking mechanisms to effect an evasive manuever. Indeed, a warning or evasive manuever must be issued as soon as possible before the brief time interval has elapsed.

Thus, during the elapsed time interval from target acquisition to intercept the system must continuously examine the content of the field of regard and track all targets until they either exit the field of regard or are rejected by the processor as collision targets. Further, as a passing target vehicle approaches the time to intercept the system must process the range and angle data in order to determine whether a collision is imminent. These concurrent requirements result in a need for high speed scanning of the field and rapid refreshing of the range and angle data collected with regard to approaching vehicles. Rapid scanning and updating is particularly important in the situation of a head-on approaching target vehicle. In such a case the path of the target vehicle differs from a normal path by only a slight amount and the slight deviation which could lead to a collision could occur in just a few tenths of a second before the time of a normal intercept with adequate separation.

Therefore, the need to be able to predict the separation distance at the time of intercept is critical in order to have sufficient time for the automated system to react and avoid collision. In order to predict whether there will be sufficient separation at the time of intercept, data must be gathered as to the target vehicle's location and range, as well as the rate of change of these parameters. The rate of change of the rate of the change is also needed in order to account for acceleration. This means at least two frames of data are required in order to accumulate rate of change data as to angle $\alpha$ and range R, and at least three frames are required to determine the rate of change of the rate of change. Multiple sets of data are preferred in order to ensure low false alarm rate and accuracy through data averaging.

The foregoing requirements suggest a frame rate of about 10 frames per second, but actually higher frame rates are desirable as shown in the ensuing discussion. Assuming two vehicles are closing at a rate of 180 feet per second, i.e. each traveling at 60 mph toward the other, the vehicles will be about 50 feet apart at a time of 0.3 seconds before intercept. This distance corresponds to about three car lengths. Thus, for vehicles travelling on a relatively narrow highway with a nominal separation of only a few feet, there is still a possibility of a head on collision at a time of 0.3 seconds before intercept. Allowing 0.1 second for a collision avoidance manuever, i.e. a steering impulse to swerve, only 0.2 seconds remains in which to gather and process data. Further assuming two sets of data for averaging with each set containing three subsets of range and angle data for range rate, angle rate and angle rate rate determination, then six sets of data must be collected and processed in 0.2 seconds, or a frame rate of 30 frames per second. It would further be very desirable to have a verification frame to eliminate spurious signals, further suggesting a frame rate of 60 frames per second.

To summarize, a nearly ideal collision avoidance sensor system would have the parameters set out in Table II:

TABLE II

| | |
|---|---|
| Horizontal Field of Regard | 60° |
| Vertical Field of Regard | 6° |
| Angular Resolution | .25° |
| Frame Rate | 60 frames/sec. |
| Range Capability | 10–1000 feet |
| Range Resolution | 10 feet |

The system parameters described in Table II yield a frame consisting of 240 elements in the horizontal direction, i.e. 60÷0.25, and 24 elements in the verticle direction, i.e. 6÷0.25. The total number of elements of "pixels" per frame is 5760, i.e. 24×240, and the scanning rate is 5760÷1/60 or 345,600 pixels per second. Assuming for the moment a 100% scan efficiency, the time between the start and finish of the scan is 1/345,600 or $2.8 \times 10^{-6}$ seconds.

The field of regard, angular resolution and frame rate can be satisfied by the high speed optical scanner described and claimed in U.S. Pat. No. 4,538,181. Such a scanner typically is used to collect radiation from a scene, such as collecting infrared radiation to provide a thermal imager, also known as a forward looking infrared ("FLIR"), or in a write mode using a laser beam. The present requirement, however is for a high speed rangefinder.

In the scanner described in U.S. Pat. No. 4,538,181, a scanning disc with embedded reflectors rotates at high speed to achieve a scan of a horizontal segment of an image. Preferably, the reflectors are spherical reflectors which lie on a circle at a specified distance from the center of the disc. Each reflector has a focal point on a line perpendicular to the face of the disc at a distance equal to the focal length of the reflector.

Figure 9A:
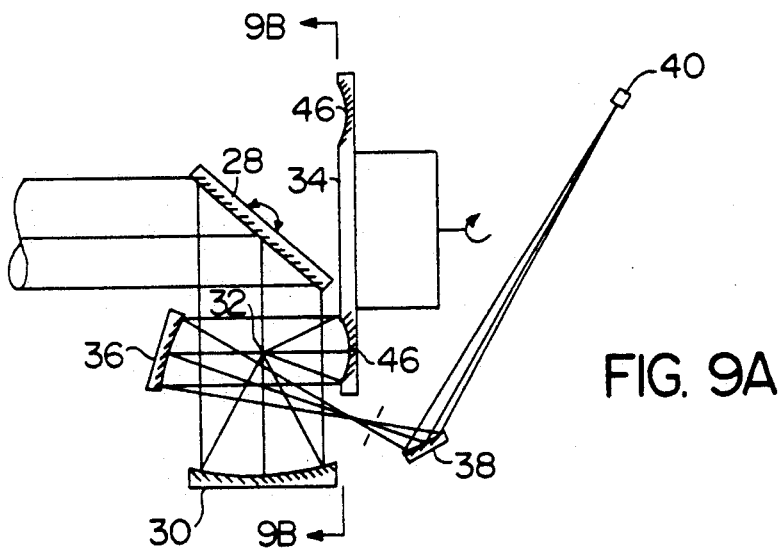
FIG. 9A is a partial elevation view of the rangefinder scanner in accordance with the invention, illustrating the receiving channel optical configuration.
Figure 9B:
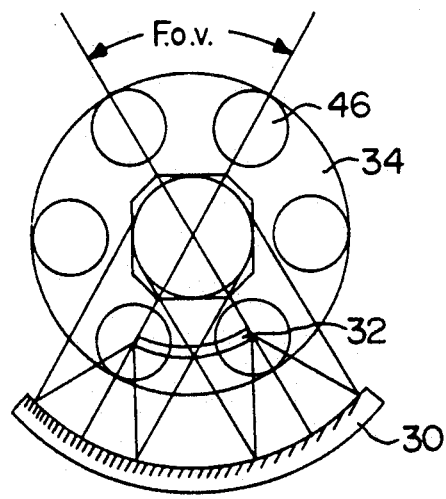
FIG. 9B is a partial cross-sectional view of the scanner optics shown in FIG. 9A, taken along lines 9B—9B of FIG. 9A.

Referring now to FIGS. 2, 9A–9D and 10, the optical scanning configuration of a high speed electro-optical rangefinder scanner in accordance with the invention is shown. At any point in time the horizontal segment of the field of view is imaged by framing mirror 28 and primary mirror 30 onto strip mirror 32. The horizontal segment is scanned one pixel at a time in the vertical direction by rotating disc 34 having concave reflectors 46 disposed a fixed distance from the strip mirror. Scanning disc concave reflectors 46 are spherical or aspherical reflectors disposed at a distance from the strip mirror equal to the concave reflector focal length, resulting in a collimated light beam corresponding to each pixel scanned by the reflectors. The collimated beam from the concave reflector is directed to a fixed, larger aperture collection mirror 36, which focuses the collimated beam to a single focal point. The dimension of the detector element defines the dimensions of the pixel. In accordance with the present invention, optical relay mirror 38 is added to the system to lengthen the focal length of the system. Relay mirror 38 reflects and focuses a magnified image onto linear detector array 40 disposed some distance away. FIG. 9B is an elevation view of the scanner taken along lines 9B—9B of FIG. 9A, showing the relative position of the scanning disc, strip mirror, and focusing mirror.

Figure 9C:
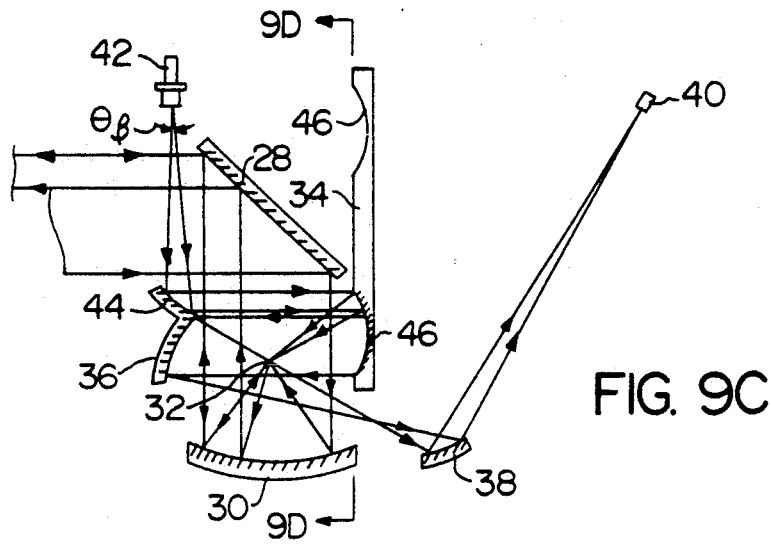
FIG. 9C is an elevation view of the rangefinder scanner in accordance with the invention, illustrating the preferred transmission and receiving channel optical configuration.
Figure 9D:
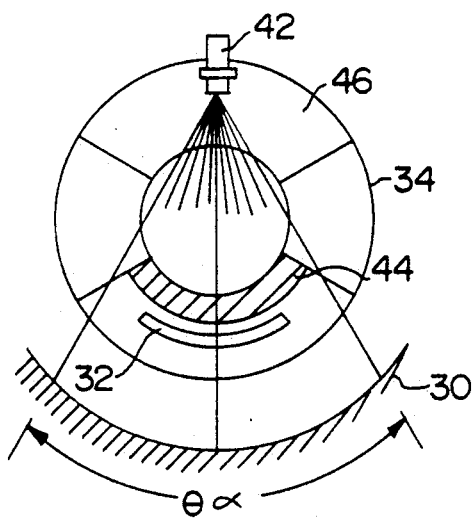
FIG. 9D is a partial cross-sectional view of the scanner optics of FIG. 9C, taken along lines 9D—9D of FIG. 9C.

FIGS. 9C and 9D illustrate the transmission optical channel constructed as an integral part of the same package. As shown in FIG. 9C, radiation source 42, such as a laser diode, emits radiation having a solid angle $\theta_\beta$ toward transmission mirror section 44. The laser diode is disposed away from transmission mirror section 44 by a distance equal to the focal length $f_t$ of the transmission mirror section, so that light from the diode is reflected in a collimated beam by the collection optic transmission section toward a portion of scanning disc reflector 46. Continuing to use the optical system in reverse, the laser diode pulse is focused onto strip mirror 32, which reflects the image to primary mirror 30 and framing mirror 28 to provide a rangefinding beam which is transmitted into the field of regard. The transmitted beam, like the received beam, are shown in collimated form because light to and from a distant object, i.e. more than a few feet, accurately may be depicted in collimated form. FIG. 9D is an elevation view of the transmission optics taken along lines 9D—9D of FIG. 9C, showing laser diode emitting source 42, the transmission and receiving mirror sections 44,36, the scanning disc 34, strip mirror 32 and primary mirror 30. As will be noted, in FIG. 9D the disc reflectors are shown as sectors rather than as circular (compare FIG. 9B). The reflectors have the same optical characteristics, but the sector configuration provides more uniform pixel illumination. In operation, transmitted light will be reflected from the disc mirror to the strip mirror, primary mirror and scanning mirror during that portion of the disc mirror scan when laser diode 42 is activated, thereby creating a transmitted pulse. In FIGS. 9C and 9D a pixel is read and written in synchronization with the arc or pixel size illuminated at any instant in time being defined by the active area of the radiation source, and by the focal length of the optics in the transmission channel. This may be expressed as follows:

$$\Delta X = \frac{d_x}{f_{s,t}} \quad (15)$$

and, $$\Delta Y = \frac{d_y}{f_{s,t}} \quad (16)$$

where $\Delta X$ and $\Delta Y$ are the pixel dimensions in radians and $d_x$ and $d_y$ are the dimensions of the active area of the radiant source, and $f_{s,t}$ is the system focal length in the transmission channel. The system focal length is defined by:

$$f_{s,t} = f_p \frac{f_t}{f_d} \quad (17)$$

where $f_t$ is the focal length of transmission mirror section 44, and $f_p$ and $f_d$ are the focal lengths of primary mirror 30 and scanning disc reflector 46.

Figure 9E:
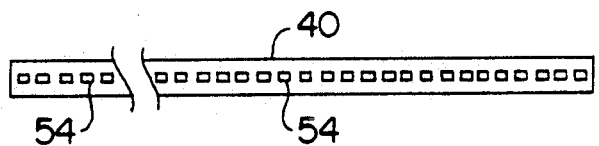
FIG. 9E is a partial plan view of a linear detector array.

In order that all pixels in the scene will be illuminated, the emitted radiation defines a particular beam shape. The beam shape for the geometry shown in FIGS. 9C and 9D are designated $\theta_\alpha$ and $\theta_{62}$ which correspond to the beam in the horizontal and vertical dimensions. For the case illustrated, $\theta_\alpha$ is about 50° and $\theta_\beta$ is about 5°. All pixels in a line are illuminated at the instant the source is activated. The transmission configuration of FIGS. 9C and 9D is preferred, but alternate transmission optical configurations may also be used and no doubt can be devised by those skilled in the art after consideration of and practice with the invention. FIG. 9E illustrates in plan view a linear detector array 40 useful in the present invention. Preferably, linear detector array 40 has at least 120 detector elements 54.

In a typical scanning operation, if a linear detector array having N detector elements is used, then N pixels each located side by side in the scene are addressed concurrently. In the rangefinder of the present invention, however, a linear array is employed not to image several horizontally located pixels at once, but rather to measure the time of flight of a pulse of light transmitted to the target and returned to the scanner. The rangefinder principle of the present invention will be explained with reference to FIGS. 10A through 10C, which illustrate the optical path in an unfolded straight line. Optical elements are shown as lens elements for purpose of illustration only, reflecting elements being preferred. In FIG. 10A, at a time $t=t_0$ a laser pulse is transmitted toward a target vehicle B with the position of the scanning disc and, more particularly, scanning disc mirror 46 known. In FIG. 10B, after a period of time $\Delta t$ has elapsed, the pulse reaches the target vehicle and is reflected. At this point in time the disc mirror has moved a distance $\Delta d/2$ corresponding to a distance $D/2$ on the linear array. In FIG. 10C, at a still later point in time $t=2\Delta t$, the pulse has returned to the system focal point. By this time the scanning disc mirror has moved a distance $\Delta d$, which increment is magnified by the relay optic so that the return pulse is measured at a point 56 on the linear array disposed a distance $D$ from the position on the array corresponding to the position of the scanning disc reflector at $t_0$. The displacement $D$ along the array is:

$$D = f_s \Delta \sigma \quad (18)$$

where $\Delta \sigma$ is the angle through which the disc has rotated during the two way flight of the pulse and $f_s$ is defined by:

$$f_s = f_p \frac{f_c}{f_d} M \quad (19)$$

where $f_p$, $f_c$ and $f_d$ are the focal lengths of the primary mirror, collection mirror and disc mirror, respectively, and M is the magnification of the relay mirror.

Angle $\Delta \sigma$ is proportional to the range as follows:

$$\Delta \sigma = 2\omega \Delta t \quad (20)$$

where $\omega$ is the angular rate of rotation of the disc and $\Delta t$ is the one way time of flight of the light pulse. Further, the one way pulse travel time $\Delta t$ is related to range R as follows:

$$\Delta t = \frac{R}{c} \quad (21)$$

where c is the speed of light.
Therefore:

$$\Delta \sigma = 2\omega \frac{R}{c} \quad (22)$$

and, $$D = 2f_s \omega \frac{R}{c} \quad (23)$$

thereby establishing the direct relationship between the range R and the location of the detected pulse on the detector array. Equation (23) may be expressed in terms of disc motor speed in revolutions per minute as follows:

$$D = 2f_s \omega \text{rpm} \frac{2\pi}{60} \frac{R}{c} \quad (24)$$
$$= \frac{\pi}{15} f_s \omega \text{rpm} \frac{R}{c}$$

or, $$D = \frac{\pi}{45} f_s \omega \text{rpm} R \times 10^{-8} \text{ meters} \quad (25)$$

with $f_s$ and R expressed in meters.

For example, if $f_s=0.75$ meters, $\omega \text{rpm}=15,000$, and $R=100$ meters, then $D=0.785$ mm. Further, if $R=500$ meters, then $D=3.92$ mm, which is near the maximum detector array length required. If the range resolution is 3.0 meters, then the separation distance $\Delta D$ between detector array elements is $$\frac{\Delta D}{D} = \frac{\Delta R}{R} \quad (26)$$

and if $\Delta R=3$ meters, $R=100$ meters, and $D=0.785$ millimeters, then $\Delta D=0.0235$ millimeters.

The exemplary system focal length of about 0.75 meters may be achieved by the focal lengths and magnification listed in Table III.

TABLE III

| |
|---|
| $f_p = 18$ mm |
| $f_d = 12$ mm |
| $f_c = 33.33$ mm |
| M = 15 |

The foregoing system dimensions advantageously provide a very long effective focal length in a relatively small configuration. The package size in which suitable optics with these focal lengths may be housed is on the order of 6.0×6.0×10.00

The laser diode pulse is transmitted at the very beginning of the scan of the corresponding pixel and will fill the entire 0.25°×0.25° object space. Any target within this area will be illuminated and can provide a return. Generally there will be one return per pixel. Subsequent to the pulse transmission, range returns associated with the pixel are detected by the linear detector array, with the resulting detector signals being processed by the range decoder to provide range and angle information to the system processor.

Light travels at $3 \times 10^8$ meters per second, and travels one foot in one nanosecond ($10^{-9}$ sec.). Therefore, a ranging pulse of light transmitted at the start of the scan of a pixel can travel 2800 feet before the start of the scan of the next pixel. If the pulse is reflected from a vehicle in front and returns to the sensor in the same pixel scan, then the vehicle separation can be up to 1400 feet and the entire process occurs during one pixel scan. If, however, the vehicle separation is greater than 1400 feet, e.g. 1410 feet, the return pulse will arrive during the next succeeding scan and cannot be differentiated from the succeeding pulse. In the present invention this problem is addressed with a staggered overscan and thresholding.

Figure 8:
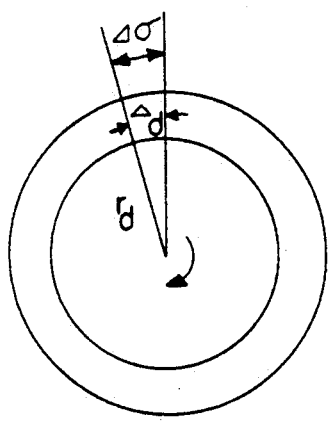
FIG. 8 is a plan view of a rotating scanning disc.

During the time of flight of a transmitted and reflected pulse the high speed rotating scanning disc of the rangefinder scanner of the present invention will have rotated a finite amount. For example, if the disc rotates at 15,000 revolutions per minute, in one second the number of rotations will be 250. In $20 \times 10^{-9}$ seconds, the time required for a light pulse to travel 10 feet and back after reflection, the disc will have rotated $5.0 \times 10^{-6}$ revolutions. Referring to FIG. 8, in terms of the angle $\Delta\sigma$, traversed by the scanning disc, this is $(5.0 \times 10^{-6}) 2\pi$ or $31.415 \times 10^{-6}$ radians. The linear displacement incurred by a point on the face of the disc can be determined from:

$$\Delta d = r_d \Delta \sigma \qquad (27)$$

where:
 $\Delta d$ = displacement of the point on the disc in the tangential direction;
 $r_d$ = the radial distance of the point from the axis of rotation of the disc, and
 $\Delta\sigma$ = the angular displacement of the disc.

If $r_d = 20$ millimeters, then for $\Delta\sigma = 31.415 \times 10^{-6}$ radians $\Delta d = 20 \times 31.415$ or $0.628 \times 10^{-3}$ millimeters. Such a distance is large enough to be measured by high precision metrology instuments. As will be appreciated, the focal points of the concave reflectors rotate with the disc and the above discussion relating to movement of a point on the disc also holds true for the reflector focal points. In accordance with the invention, the distance is optically magnified in order to make the displacement of the returned light pulse detectable on an array of conventional light detecting diodes, e.g. silicon photodiodes.

Depending upon the range of the target vehicle, a particular detector element in the linear detector array will be activated. In order to provide the most accurate indication of the zero time reference when the pulse is emitted, it is contemplated that it may be desirable to permit a small amount of light from the transmitted pulse to scatter back through the optics to the detector. This approach to determining the zero time reference is particularly desirable since it is independent of any inaccuracy which might be introduced should the pulses lead or lag the desired timing, e.g. due to thermal effects in the pulse generating circuitry. The range determination is made by counting the number of detector elements between the zero time reference signal and the next activated detector element. The target range is proportional to the distance between the activated detectors. The target angle is directly related to the particular pixel being scanned, and is determined from the positions of the framing mirror and scanning disc at the time the pulse is emitted, i.e the elapsed time from the start of the scan, all of which are continually monitored and controlled by the system electronics.

Figure 2:
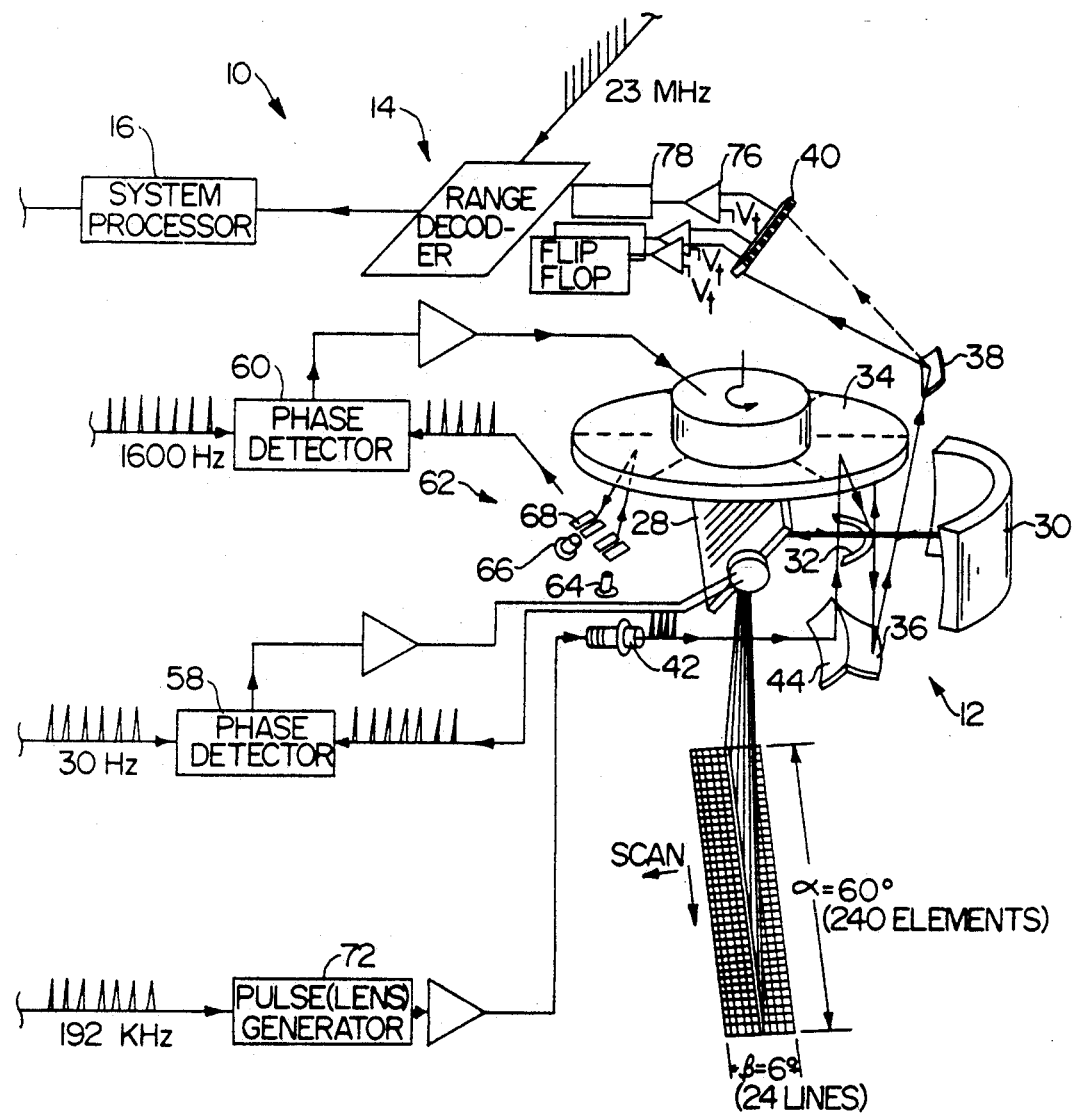
FIG. 2 is a perspective illustration of the collision avoidance system, particularly the rangefinder scanner.

FIG. 2 is a perspective view of the rangefinder scanner. As shown, pulsed illumination source 42 transmits a radiation pulse towards transmission mirror 44, which reflects the pulse to the scanning disc 34. The scanning disc reflector 46 focuses the pulse onto strip mirror 32. The primary mirror 30 and the framing mirror 28 transmit each pulse in the direction of all pixels in the line being ranged. Because each pixel is $0.25° \times 0.25°$, the frame defines 240 elements by 24 lines. Illumination source 42 may be a laser diode driven by a pulse generator 58, such as a 192 KiloHertz pulse generator driven to produce a pulse every 5.2 microseconds, with each pulse having a duration of about 20 nanoseconds. Because the potential target vehicles are equipped with high efficiency retroreflectors, such as one or a series of cube corner retroreflectors, and because the system operating range is shorter than military laser ranging systems, a relatively low power laser diode operating in an eye safe spectral band can be used.

The return beam is scanned by framing mirror 28 and focused by primary mirror 30 onto strip mirror 32, which reflects the image to the scanning disc reflector 46. The collimated beam from the disc reflector is focused by collection optic 36 via relay optic 38 onto a linear detector array 40. As indicated, the relative position of the return beam at the detector array corresponds to the range of the target pixel. Framing mirror 28 is driven at 30 Hertz using a phase detector 60 and position encoder coupled to a servo drive mechanism. Scanning disc 34 is driven by a speed control mechanism operating at about 1600 Hertz and including a line synch generator 62 coupled to phase detector 60. The line synch generator may comprise a light source 64 and detector 66, with suitable framing slit apertures 68,70, to project a line signal onto the scanning disc and receive the reflected signal. All of the foregoing events are synchronized by the master or reference clock. As explained below, the clock speed is dictated by the operating speed of the range decoder, with a preferred clock of at least about 23 megahertz.

Each line is synchronized to the others by means of a closed loop control of the scanning disc. The actual rotational position of each disc mirror at any time is known from the phase relationship between a reference clock pulse train at 1600 Hz. and a pulse train generated by electro-optical synch generator 62 in conjunction with the scanning disc. The synch generates a pulse by means of light source 64, e.g. a light emitting diode such as a silicon PIN diode. One or more disc synchronization reflectors are located on the disc, e.g. radially inward or outward of each reflector 46 or on the opposite side of the disc. Preferably six non-staggered disc synchronization reflectors are disposed adjacent to the main disc reflectors. Slits 68,70 are disposed in front of the synchronization source and detector in order to generate a sufficiently sharp synchronization pulse train. The pulse train generated by the electro-optical line synch generator nominally is 1600 Hz., and is fed into phase detector 60 along with the 1600 Hz. reference signal from the processor. It will be noted that $1600 = 1/0.625$ milliseconds. The phase difference between these two signals generates an error signal for the closed loop servo system which is used to drive the error to zero by driving the scanning disc faster or slower, as necessary.

The frames are synchronized in a similar manner. A pulse train from a position encoder on the pivot axis of framing mirror 28 is fed into a phase detector 72, which also receives a 30 Hz. reference pulse train from the master clock. The speed of the drive motor is adjusted accordingly, either upward or downward, to maintain synchronization. For the purposes of the present discussion, it is assumed that the framing mirror is driven in the desired sawtooth pattern by a motor driving a mechanical cam. If greater precision is required, a bidirectional torque motor or galvanometer configuration could be used.

The active portion of the framing mirror scan is set at 30 milliseconds. This allows 3.33 milliseconds for mirror flyback and results in a line scan time, $t_L$, as follows:

$$t_L = \frac{\text{frame time}}{(\text{number of lines})(\text{overscan})} \qquad (28)$$

$$= \frac{30 \text{ milliseconds}}{(240)(2)}$$
$$= .625 \text{ milliseconds}$$

The pixel dwell time, $t_p$, is:

$$t_p = \frac{\text{line time}}{\text{number of pixels per line}} \quad (29)$$
$$= \frac{625 \ \mu S}{240}$$
$$= 2.604 \ \mu S$$

Knowing the line scan time and the number of disc reflectors, the speed of rotation of the disc, $t_d$, can be determined as follows:

$$t_d = (\text{number of disc reflectors}) \times t_L$$
$$= 6 \times .625 \text{ milliseconds}$$
$$= 3.75 \text{ milliseconds per rotation}$$

The rotation rate is:

$$1/t_d = 266.67 \text{ rev. per sec.} = 16,000 \text{ rev. per min.}$$

which is well within the cepability range of existing scanners of this type.

The manner in which the detector array information may be converted into range data comprises the circuitry exemplified in FIG. 11. As there shown, linear detector array 40 has a plurality of detector elements 54 having a detector element separation distance ΔD, with each detector element lead 74 connected across a load resistor $R_L$ to a comparator 76. The comparator senses the voltage of the detector and compares the voltage to a preset threshold voltage $V_t$ set at the minimum voltage to be detected. The output of each comparator triggers a flip flop 78. The range decoder 14 queries the flip flops in the period during which the pixel is scanned and converts the output into range data. The flip flops are reset on transmission of the next ranging light pulse.

As stated, with a finite frame time and accounting for the scanning mirror flyback time, e.g. 15 milliseconds active frame time and a 1.67 millisecond flyback time, the dwell time per pixel is 2.6 microseconds. This corresponds to a one-way range of about 1300 feet. If, however, the target was located at a distance of 1310 feet, the reflected pulse would return after transmission of the next pixel pulse and incorrectly would be detected as the return signal for the next pulse. This problem introduces a range ambiguity which can be substantially eliminated by employing a staggered overscan technique.

Figure 12A:
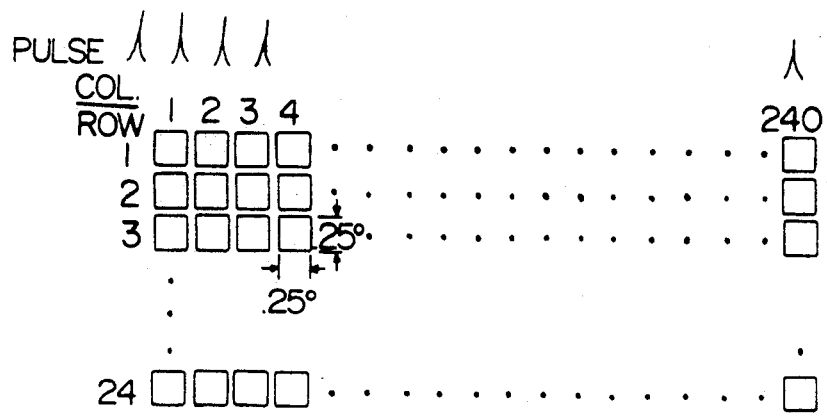
FIG. 12A is a plan view illustrating a first rangefinder scanning arrangement.
Figure 12B:
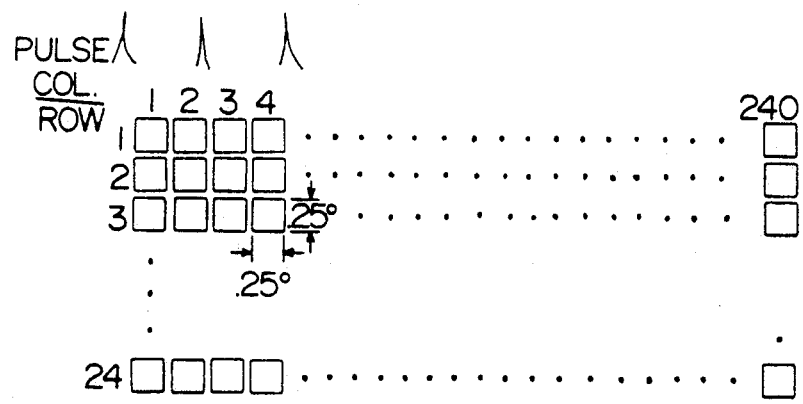
FIGS. 12B and 12C are plan views of a second rangefinder scanning arrangement providing a staggered overscan, illustrating first and second passes, respectively, across one row during the staggered overscan.
Figure 12C:
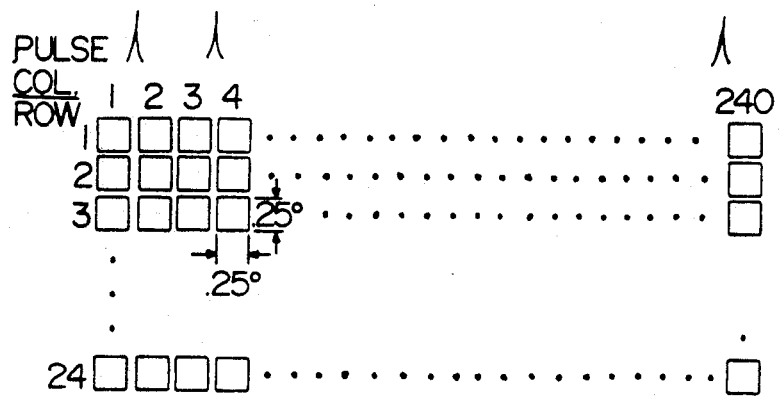

The principle of the staggered overscan in accordance with the present invention can be explained and is best understood in conjunction with FIGS. 12A through 12D. In FIGS. 12A through 12C a frame of pixels is shown arranged in 24 rows and 240 columns corresponding to the scene to be scanned. Each pixel measures 0.25°×0.25°. FIG. 12A illustrates a first type of scan wherein a pulse 80 would be transmitted at the beginning of each pixel in a left to right scan across each row. If this type scan were to be used in the rangefinder scanner of the present invention the pulses would be transmitted every 2.6 microseconds, and the framing mirror would oscillate at a speed to provide an active frame time of 15 milliseconds (see FIG. 12D).

The preferred staggered overscan will now be explained with reference to FIGS. 12B and 12C, illustrating first and second scans, respectively, of a single line.

In this configuration, the framing mirror operates at one half the speed of a conventional scan so that two passes can be made across each row before the framing mirror advances to the next row. As shown in FIG. 12B, during the first scan of row 1 a pulse is emitted at the beginning of the scan of each odd numbered pixel 1, 3, 5, 7, etc., or every 5.2 microseconds. Thus, during the first pass of row 1 a pulse is emitted just before pixel 1 and the detector array output channels are queried during the period from the pulse emission before pixel 1 to the pulse emission for pixel 3, the next pulse to be emitted after pulse 1. Likewise, a pulse is emitted just before pixel 3 is scanned and the detector array similarly is queried. During the first pass across row 1 this pattern of emitting a pulse before each odd numbered pixel and then querying the detector for a return signal is repeated over and over across the row. Referring now to FIG. 12C, during the second pass of row 1, a pulse is emitted before each even numbered pixel and, as in the first pass, the detector is queried for a period of two "range intervals" before the next pulse is emitted. After both passes across the row have been made, the framing mirror advances to the next row where the process is repeated. Each row is scanned in this manner until the entire frame has been scanned.

Figure 12D:
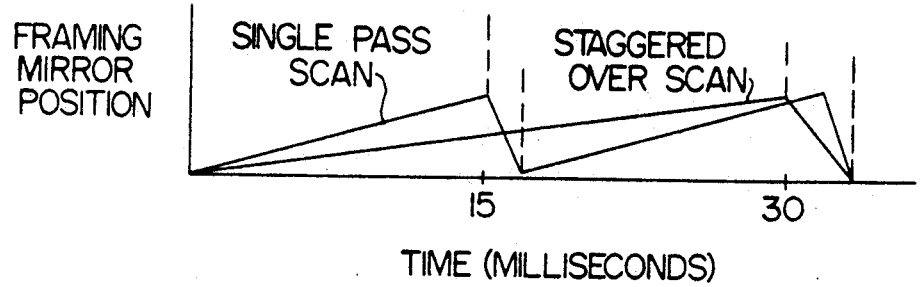
FIG. 12D is a graph illustrating the framing mirror pattern in the first and second scanning patterns.

FIG. 12D illustrates the sawtooth pattern of the framing mirror in the conventional scan and staggered overscan. As shown, in the first type of scan a single pass is made of each row and the framing mirror oscillates at high speed to provide a frame time of about 15 milliseconds. However, in the staggered overscan of the present invention the framing mirror oscillates at one-half the rate of the first scanning pattern in order to allow time for two scans across each line. The result is a 30 millisecond frame time with a slightly longer flyback time which is approximately equal to the total time occupied by the two flybacks which occur in the first type of scan during the same elapsed time.

In principle, the ambiguity range could be increased indefinitely by extending the scanning period between transmitted pulses, but a penalty must be paid in the form of increased frame time. In the present invention, eliminating the first order range ambiguity suffices since pulse returns from the second and subsequent ambiguities can be eliminated through signal thresholding, as explained below.

In the present invention, the staggered overscan may be accomplished optically without interrupting the steady flow of light pulses. Thus, in the rangefinder scanner of the present invention staggering may be accomplished by biasing the location of alternate disc mirrors on the scanning disc. Every other disc mirror is shifted along the arc, or circle, which defines the locations of the disc mirror in the radial direction. The amount of the shift required is exactly equal to the length of a single pixel on the strip mirror. The arc length of a single pixel αs is:

$$\Delta s = r_d \Delta \sigma \quad (30)$$

where $r_d$ is the radial distance from the center of the scanning disc to the center of the reflector. For $\Delta \sigma = 0.25$ degrees or 0.00436 radians, $\Delta s = 0.08725$ mm. In the preferred scanning disc there are six reflectors, so reflector symmetry is preserved.

Figure 13:
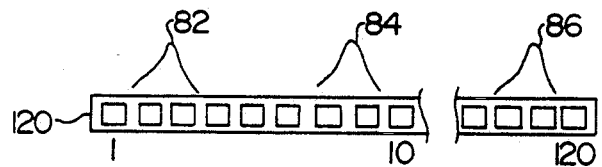
FIG. 13 is a partial plan view of a linear detector arrangement illustrating actuation of the array by time zero and reflected light pulses.

In the preferred embodiment wherein the linear detector array has 120 detector elements, the range decoder checks the output levels of 120 flip flops between pulses, i.e. every 5.2 microseconds, and identifies the zero time reference and the correct target pulse, if any. That is, multiple detector elements may be activated due to return signals from multiple targets in the same pixel or spreading of the illumination spot due to diffraction or aberrations. This is illustrated in FIG. 13, wherein portions of detector array 40 are illuminated first by the zero time reference signal 82, then by a first target return signal 84, and then by a second target return signal 86. The range decoder identifies each detector element or set of detector elements activated and accepts only the zero time reference and the first target return signal, rejecting the second target return. In addition, the range decoder preferably identifies and uses only one activated detector element from each activated set for purposes of range and angle determination. For example, the range decoder could be programmed to identify and select the next to last activated detector element in each of the zero time or accepted target reference group of activated cells for the purpose of range calculation. Such a convention eliminates any problem due to illumination of multiple detector elements due to spread of the illumination spot, etc.

In order for the range decoder to perform these functions it must operate at a speed sufficient to address all the cells in the specified scan time, in this case 5.2 microseconds. For a linear detector array having 120 elements, this dictates a minimum clock speed on the order of about 23 megahertz. Such a clock speed may be accomplished with sophisticated microchips which are commercially available. Slower clock speeds could be used by reducing the maximum target range, and faster clock speeds available with state of the art and future generation microprocessor chips, i.e. upwards of 50 to 100 megahertz, could be used to extend the effective operating range and may give rise to other, nonautomotive applications. To summarize, in the preferred rangefinder scanner the relative timing is as follows:

| | |
|---|---|
| pulse time | 20 nanoseconds |
| pixel scan time | 2.6 microseconds |
| line scan time | 625 microseconds |
| frame scan time | 30 milliseconds |
| framing mirror flyback | 3.3 milliseconds |

Another factor affecting range resolution is the duration of the transmitted pulse. Ideally the pulse duration would be instantaneous, but the shorter the pulse the weaker the energy which is transmitted for a given power level. A 10 microsecond pulse duration would yield the desired 10 foot range resolution. However, the duration can be extended somewhat, to 20 to 30 microseconds. In that case, the range decoder would be programmed to designate the next to the last detected pulse as true rather than the last return which may be the result of the lengthened pulse time. The same approach may be taken in order to compensate for an over-sized light spot on the detector, which may be due to diffraction or aberrations.

As stated, thresholding also may be used to eliminate spurious return signals. One form of thresholding in the present invention is the retroreflectors installed on all vehicles. These provide strong return signals for target vehicles but not natural surroundings. Any object, such as a bridge abutment, advantageously can be converted into a target by being provided with one or more reflectors. Further thresholding may be accomplished using one or more optical filters in front of the detector array, by adjusting the detector element load resistor $R_L$, and/or by adjusting the comparator threshold voltage $V_t$. Because signals returning from distant targets are far weaker than close targets of primary concern, such thresholding can be used to eliminate further range ambiguities.

Figure 14:
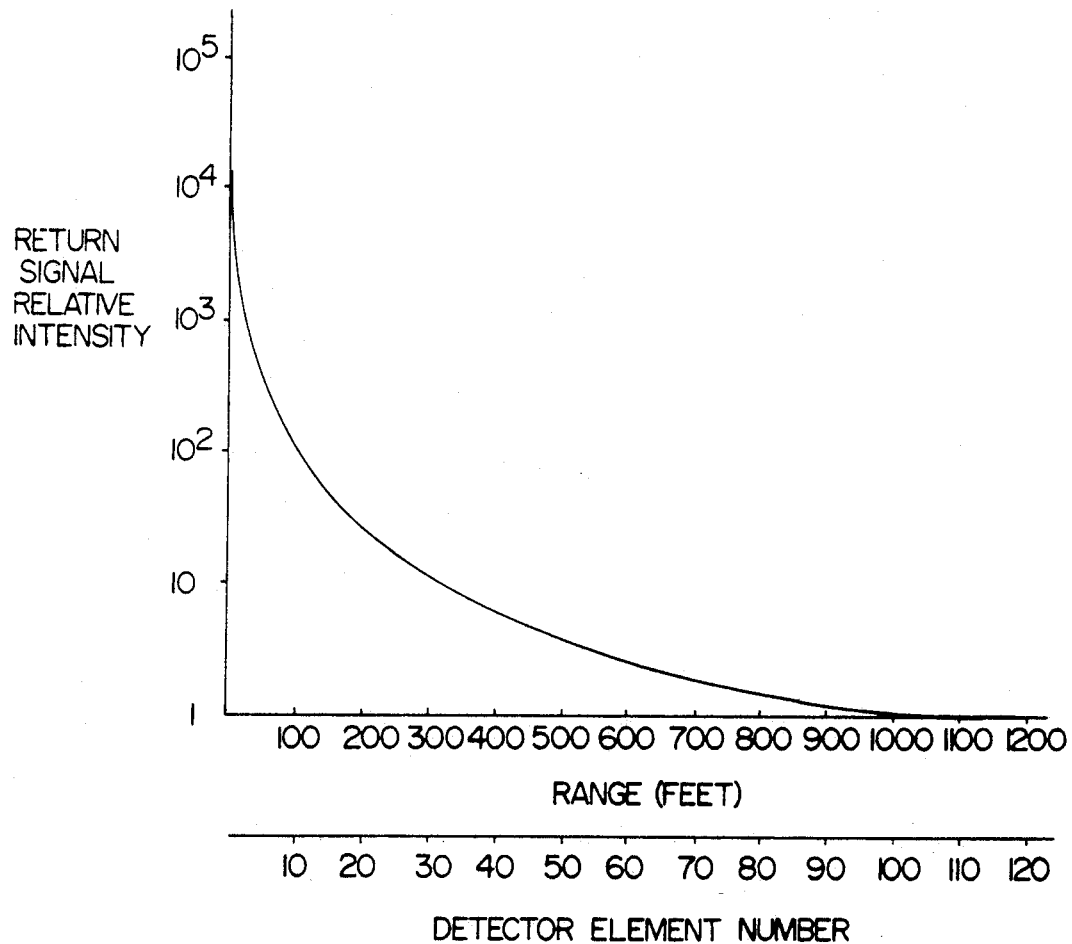
FIG. 14 is a graph illustrating the relative intensity of the reflected light pulse as a function of target distance.

In addition, there will be a wide range of return pulse strengths depending upon target distance, e.g. as much as a factor of 14,000 between a target located at a distance of 10 feet and one at 1200 feet. This is because the strength of the transmitted signal decreases far more over range than does the strength of the image reflected from the retroreflector. That is, the signal transmitted to the retroreflector diminishes geometrically with distance, whereas the retroreflector returns the signal with high efficiency. Absent some type of compensation this phenomenon will result in a wide range of signal strengths at the detector, so it may be desirable to equalize the signal strength with a variable range intensity equalization filter for each detector. By way of example only, such signal equalization may be accomplished by varying the threshold voltage $V_t$ in response to the expected intensity of the returned reflection. FIG. 14 shows the relative return signal intensity as a function of target range. Because range corresponds to detector element position, a second coordinate is added to the x axis to indicate range in terms of detector array location. The threshold equalization filter should vary with the position of the detector element relative to the pulse transmission. Thus, detector element number 10 which is near the time zero detector element would have a relatively high threshold to account for strong signal return from a close target, whereas subsequent detector elements would have progressively lower threshold values in order to detect weaker signals from more distant targets. Proportional thresholding can be accomplished along the array, such as by providing a variable optical filter or by varying the load resistance $R_L$ and/or the comparator voltage threshold for each detector element.

The range and angle data are fed to the system processor which outputs appropriate signals to the vehicle control system. The processor takes range and angle data for a number of targets within the field of regard and computes the rate of range closure (or opening in the case of diverging vehicles) by comparing range data from successive frames. The processor tracks targets by comparing the target locations from one frame to the next and, most importantly, predicts where the target will be at the time of intercept. Remarkably, the prediction algorithm is simply the equation of one dimensional motion with constant acceleration, and suffices for all scenarios: vehicles going in the same or opposite directions; straight or curved paths; right angle crossings; converging or diverging or oblique or acute paths.

$$W_p = W_o + \dot{W}t_i + \tfrac{1}{2}\ddot{W}t_i^2 \qquad (31)$$

where:
  $W_p$ = the projected separation between the two vehicles at the time of intercept;
  $t_i$ = the time to intercept;
  $W_o$ = the separation of the vehicles at the instant the range and angle data are taken, ($W_o = R_o\alpha_o$);
  $\dot{W}$ = the calculated rate of change of separation between the vehicles; and
  $\ddot{W}$ = the calculated acceleration of separation.

Of the above parameters, $t_i$, $\dot{W}$ and $\ddot{W}$ may be calculated from equations (32) through (34), where numbered subscripts denote data from successive frames.

$$t_i = \frac{R}{\dot{R}} \quad (32)$$
$$= \frac{R}{R_1 - R_2} \Delta t$$

where $\Delta t$ is one frame time.

$$\dot{W} = \frac{\Delta W}{\Delta t} \quad (33)$$
$$= \frac{W_1 - W_2}{\Delta t}$$
$$= \frac{R_{1a1} - R_{2a2}}{\Delta t}$$

$$\ddot{W} = \frac{\Delta \dot{W}}{\Delta t} \quad (34)$$
$$= \frac{\dot{W}_1 - \dot{W}_2}{\Delta t}$$

The effectiveness of equation (31) as a suitable algorithm for all scenarios can be demonstrated by considering vehicles approaching each other on straight and curved paths. Considering once again FIG. 6 and the law of cosines relating range R and the radii of curvature $r_a$ and $r_b$ of the paths of vehicles A and B to the vehicle separation W:

$$W = R\sin\alpha \quad (10)$$
$$= \frac{r_b^2 - R^2 - r_a^2}{-2r_a}$$

Substituting equation (13) for R into the above equation gives the separation of the vehicles at any time t in terms of their path radii, velocities and starting position.

$$W = r_a - r_b \cos[\phi_o - \omega t] \quad (35)$$

where:
$\phi_o$ = the initial angle separating the vehicles; and
$\omega$ = the angular rate of closing of vehicles.
$\omega$ can be expressed:

$$\omega = \frac{V_a}{r_a} + \frac{V_b}{r_b} \quad (36)$$

For values of $\phi_o - \omega t$ near the time of intercept a good approximation of term $\cos[\phi_o - \omega t]$ is:

$$1 - \tfrac{1}{2}[\phi_o - \omega t]^2 \quad (37)$$

Substituting equation 36 into equation 37 yields:

$$W = \underbrace{r_a - r_b + \frac{r_b}{2}\phi_0^2}_{W_o} - \underbrace{r_b\phi_0\omega t}_{\dot{W}} + \underbrace{\frac{r_b}{2}\omega^2 t^2}_{\ddot{W}} \quad (38)$$

The bracketed expressions correlate with equation (31) exactly and the equations are identical.

The separation W can be express in terms of the time to intercept, $t_i$ by substituting the following relationship into equation (38):

$$\phi_o = \omega t_i \quad (39)$$

The separation equation becomes:

$$W = r_a - r_b + \frac{r_b}{2}\omega^2 t_i^2 - r_b\omega^2 t_i t + \frac{r_b}{2}\omega^2 t^2 \quad (40)$$

Given an initial time $t_i$ as the number of seconds to intercept, the separation W can be calculated as a function of time from the initial instant to the time of intercept. When intercept occurs at $t = t_i$, $$W(t_i) = r_a - r_b \quad (41).$$

That is, the separation between the vehicles is simply the difference in their radial path lengths when they pass each other.

The sensor of the present invention, however, does not require speed or radial path length of the vehicles, but only range and angle data of the approaching vehicle. The predicted separation distance must be determined from this data only since data on the curvature of the road or the other vehicle's speed cannot be known. By way of example, consider the case defined by Table I.

$$\phi_0 = 1.5$$
$$\omega = \frac{V_a}{r_a} + \frac{V_b}{r_b}$$
$$= \frac{90}{260} + \frac{90}{240} = .721$$

Then the time to intercept is:

$$t_i = \frac{\phi_0}{\omega} = \frac{1.5}{.721} = 2.08$$

Acquiring the range and angle data from successive frames and calculating the initial separation $W_o$, the separation velocity $\dot{W}$ and the separation acceleration $\ddot{W}$ yields:

$$W_0 = r_a - r_b + \frac{r_b}{2}\omega^2 t^2$$
$$= 260 - 240 + \frac{240}{2}(.721)^2(2.08)^2 = 290 \text{ feet}$$

$$\dot{W} = -r_b\omega^2 t_i = -259.6 \text{ feet per second}$$

$$\ddot{W} = \frac{r_b}{2}\omega^2 t = 62.4 \text{ feet per second/per second}$$

The processor can calculate the separation at later instants in time as follows:

$$W = W_0 + \dot{W}t + \tfrac{1}{2}\ddot{W}t^2 \quad (42)$$
$$= 290 - 259.6t + 62.4t^2$$

Successive range measurements made over a known time lapse are used to determine the range rate $\dot{R}$ so the time to intercept may be determined from:

$$t_i = \frac{R}{\dot{R}} \quad (43)$$

The time of intercept will be inaccurate to the extent the range measurement is inaccurate. However, through successive frame averaging $t_i$ will become known with reasonable certainty. In the example above, $t_i$ becomes known to be 2.08 seconds. Substituting 2.08 seconds for t in equation (42) indicates that the separation at the time of intercept will be 20 feet. Thus, it is known 2 seconds in advance that the vehicles will pass safely if they maintain their respective paths. The collection and processing of range and angle data is repeated continuously as the vehicles approach one another and, should a separation prediction develop which is less than a preset acceptable limit, a warning signal or evasive action signal is sent to the vehicle control center. As stated, equation (31) remarkably may be used to predict separation distance for curved path scenarios or straight path scenarios, including parallel paths in the same and opposite directions, and crossing paths including right, oblique and acute angles.

Figure 15:
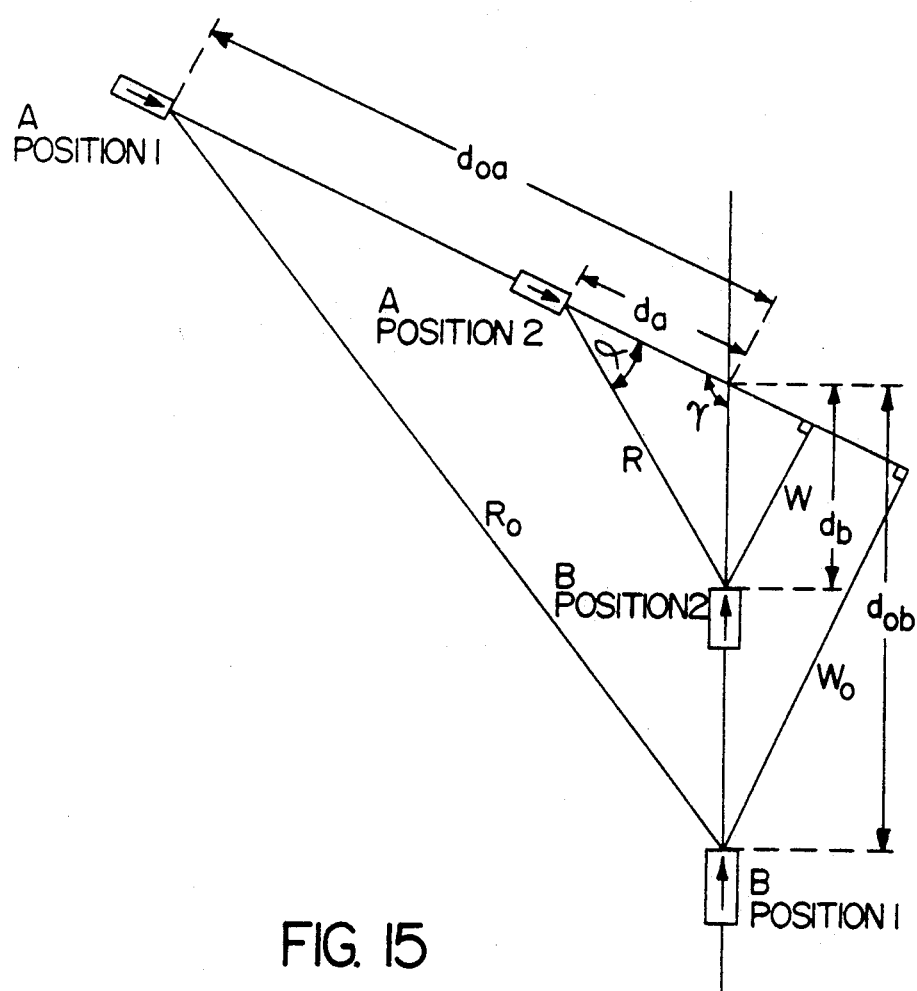
FIG. 15 is a plan view illustrating two vehicles approaching each other on straight, obtuse paths.

Referring now to FIG. 15, there is shown a geometry for two vehicles on straight intersecting paths. Angle $\gamma$ defines the approach angle of the two vehicles. For $\gamma = 90°$ a right angle intersection exists, for $\gamma > 90°$ (as shown), an oblique intersection exists, and for $\gamma < 90°$ an acute or merging type intersection exists. As $\gamma$ approaches 0, parallel, same direction paths exist and as $\gamma$ approaches 180 degrees parallel, opposite direction paths exist. For any of these situations, the location of Vehicle B on its path of travel is:

$$d_b = d_{ob} - V_b t \tag{44}$$

where
- $d_b$ = the distance from vehicle B to the point of intersection of the vehicles at time t;
- $d_{ob}$ = the initial distance of vehicle B to the intersection point; and
- $V_b$ = the velocity of vehicle B.

As before, the separation W of the vehicles at any point in time is:

$$W = R \sin \alpha \tag{10}$$

The separation as seen from vehicle A is independent of the position of vehicle A on its path. Applying the law of sines to the triangle formed by the range R and the distances $d_a$, $d_b$ of the vehicles from the intersection point:

$$\frac{R}{\sin \gamma} = \frac{d_b}{\sin \alpha} \tag{45}$$

from which the separation is determined to be:

$$W = R \sin \alpha = d_b \sin \gamma$$

substituting from equation (45) yields:

$$W = R \sin \alpha \tag{46}$$
$$= (d_{ob} - V_b t) \sin \gamma$$
$$= \underbrace{d_{ob} \sin \gamma}_{W_0} - \underbrace{V_b \sin \gamma \, t}_{\dot{W}}$$

where the bracketed terms corresponds to the initial vehicle separation Wo at time t=o and the rate of change of separation W. Remarkably and importantly, this equation is identical to equation (31) except that there is no acceleration term since the vehicles were assumed to be travelling at constant velocity. If, on the other hand, the vehicle is accelerating or decelerating at a constant rate $a_b$ then, $$d_b = d_{ob} - V_b t - \tfrac{1}{2} a_b t^2 \tag{47}$$

and $$W = \underbrace{d_{ob} \sin \gamma}_{W_0} - \underbrace{V_b \sin \gamma \, t}_{\dot{W}} - \underbrace{\tfrac{1}{2} a_b \sin \gamma \, t^2}_{\ddot{W}} \tag{48}$$

As commonly occurs with vehicles travelling in the same direction at the same speed, there will be no velocity or acceleration terms and $$W = R_0 \sin \alpha$$
$$= W_0$$

That is, the initial separation does not change.

Thus, the foregoing collision avoidance system determines the range and angle of each target using an electro-optical scanner. The system processor uses multiple frames of data to determine the rate of change of the range and angle, i.e. velocity, and the rate of change of the rate of change, i.e. acceleration. The processor calculates the time to intercept and predicts the separation distance between the vehicles at the time of intercept. If a situation arises wherein the predicted separation distance at intercept is insufficient, an appropriate warning signal is issued to the vehicle control unit, which may be programmed to provide a warning to the driver via the vehicle console display and/or to implement evasive manuevers directly by activating the vehicle brake actuator and/or steering actuator in order to alter the course of the vehicle. Implementation of the vehicle control unit and brake and steering mechanism can be effected with existing computer and electro-mechanical control systems, or may readily be devised by those skilled in the art with existing technology based upon such existing systems as existing automotive computer control units and electro-mechanical steering and brake actuators. Of course, in taking evasive action, the subject vehicle's own speed and acceleration must be taken into account in order to avoid taking action which would create yet a further potential collision situation. The processing functions of the present invention may be accomplished with commerically available microprocessor and other digital circuitry. Needless to say, as further advances are made in the microprocessor art the capabilities of the present system may be increased. For example, with greater clock speeds multiple overscan techniques might be used to increase the range of the system, suggesting non-automotive applications such as aeronautical collision avoidance.

The foregoing description contains many details which are provided in order to facilitate understanding the principles of operation of the present invention, and should not be viewed as restricting the scope of the invention. Indeed, many variations of the foregoing specific arrangements and constructions no doubt will occur to those skilled in the art with consideration and practice with the invention, which variations will be within the scope of the invention as set forth in the claims appended hereto.

While illustrative embodiments of the invention have been described in detail in order to convey the concepts of the invention, numerous variations of the invention within the scope of the appended claims will occur to those of ordinary skill in the art. By way of example only, it is contemplated that, instead of the preferred arrangement wherein target range is determined based upon the location of the reflected light pulse on a linear detector array, the same result could be attained with a single detector by determining the rotation distance of the scanning disc.

What is claimed is:

1. A collision avoidance system comprising:
rangefinder scanner means mounted to a first vehicle for determining range and angle of at least one target; and
processor means for tracking target range and angle, said processor means predicting time of intercept of said target, and calculating the rate of change of separation distance between said target and said first vehicle, calculating the acceleration of said separation distance, and predicting the distance between said target and said first vehicle at the said predicted time of intercept, when said first vehicle is approaching said target on a variety of path geometries including a curved path, a sloped path and a straight path.

2. The system of claim 1 further comprising first vehicle warning means for issuing a collision warning in the event said predicted separation is below a preset minimum value.

3. The system of claim 2 further comprising vehicle control means for implementing collision avoidance manuevers in response to said collision warning.

4. The system of claim 1 wherein said rangefinder scanner means further comprise a transmission channel for transmitting a ranging pulse and a receiving channel for scanning at least one range interval subsequent to transmission of said ranging pulse in order to detect said ranging pulse reflected from said target vehicle.

5. The system of claim 4 wherein said rangefinder scanner means determines target range based upon the elapsed time between transmission of said ranging pulse and detection of said reflected pulse.

6. The system of claim 5 wherein said receiving channel further comprises framing mirror means for conducting a scan of a scene, primary mirror means for focusing said scan, strip mirror means for receiving said scan, rotating scanning disc means for scanning images received from said strip mirror having a plurality of scanning disc reflectors, collection optic means for receiving said image from said rotating scanning disc means and focusing images on a detector means.

7. The system of claim 6 wherein said framing mirror means oscillates to conduct a linear scan of a scene, said primary mirror means focusing said linear scan at said strip mirror means, said scanning disc reflectors scanning said linear image received from said strip mirror means pixel by pixel and transmitting said pixel image to said collection optic means, said collection optic means focusing said pixel image onto said detector means.

8. The system of claim 7 wherein said collection optic means further comprise a collection mirror and a relay mirror.

9. The system of claim 7 wherein said detector means comprise a linear detector array.

10. The system of claim 9 wherein said transmission channel further comprises radiation source means for transmitting a pulse of radiation toward a pixel in the scene to be scanned.

11. The system of claim 10 wherein said transmission channel further comprises a pulsed radiation source and transmission mirror means, said pulsed radiation source transmitting a pulse of light toward said transmission mirror means, said transmission mirror means transmitting said pulse toward at least a portion of at least one of said rotating scanning disc reflectors, said pulse being reflected by said scanning disc reflector, strip mirror means, primary mirror means and framing mirror means toward a pixel in the scene to be scanned.

12. The system of claim 11 wherein said rangefinder scanner means queries said detector means for at least one range interval subsequent to transmission of said pulse in order to detect a reflected pulse.

13. The system of claim 12 wherein said rangefinder scanner means determines the range of a target based upon (i) optical displacement between time zero at the time of transmission of said pulse and detection of said reflected pulse, and (ii) rate of rotation of said rotating scanning disc means.

14. The system of claim 13 wherein said rangefinder scanner means determines azimuth and elevation angle of a target based upon the position of the pixel in the scene.

15. The system of claim 14 wherein said processor means determines the predicted separation distance Wp between said first vehicle and the target at the time of intercept, as follows:

$$W_p = W_o + \dot{W}t_i + \tfrac{1}{2}\ddot{W}t_i$$

where:
$W_o$ = separation of said first vehicle and target at the instant the range and angle data were taken,
$\dot{W}$ = rate of change of the separation between the vehicles;
$\ddot{W}$ = rate of change of $\dot{W}$; and
$t_i$ = time to intercept.

16. The system of claim 12 wherein said rangefinder scanner means queries said detector for at least two range intervals subsequent to transmission of said pulse prior to transmission of the next pulse.

17. The system of claim 12 wherein said rangefinder scanner determines range R from:

$$D = \tfrac{\pi}{45} f_s \omega_{rpm} \cdot R \times 10^{-8} \text{ meters}$$

where:
D = displacement distance along the detector means between transmission of said pulse and detection of said reflected pulse,
$f_s$ = receiving channel focal length, and
$\omega_{rpm}$ = angular rate rotation of said scanning disc.

18. The system of claim 11 wherein said rangefinder scanner means operates at a frame rate of approximately 60 Hertz.

19. The system of claim 11 wherein said rangefinder scanner means has a field of view in one direction of at least about 60 degrees.

20. The system of claim 11 wherein said rangefinder scanner means has a field of view in one direction of at least about 6 degrees.

21. The collision avoidance system of claim 1 further comprising a retroreflector associated with said target.

22. The collision avoidance system of claim 21 wherein said retroreflector comprise at least one cube corner reflector.

23. The collision avoidance system of claim 6 further comprising detector thresholding means for eliminating spurious responses.

24. The collision avoidance system of claim 6 further comprising equalization means for substantially equalizing detector response irrespective of target distance.

25. A rangefinder scanner comprising
framing mirror;
primary mirror;
strip mirror;
rotating scanning disc having a plurality of concave reflectors disposed in an arc on one side thereof;
a collection optic; and
a detector, said framing mirror conducting a linear scan of a scene in a first direction and directing said linear scan toward said primary mirror, said primary mirror refocusing said linear scan onto said strip mirror, said concave reflectors scanning said linear image received from said strip mirror pixel by pixel in a second direction and directing said image to said collection optic which focuses said image onto said detector;
pulse transmission means for transmitting a pulse of light toward a pixel in the scene to be scanned;
range determination means for determining the range of a target in the scene based upon the time elapsed between transmission of said pulse and detection of a pulse reflected from the target.

26. The rangefinder scanner of claim 25 wherein said detector further comprise a linear detector array.

27. The rangefinder scanner of claim 26 wherein said range determination means determines range based upon optical displacement along said detector array between time zero at transmission of said pulse and detection of said reflected pulse, and the rate of rotation of said scanning disc.

28. The rangefinder scanner of claim 27 wherein said detector array is queried for at least one range interval subsequent to transmission of said pulse.

29. The rangefinder scanner of claim 28 wherein the detector is queried for at least two range intervals subsequent to transmission of said pulse.

30. The rangefinder scanner of claim 29 wherein said framing mirror and said rotating scanning disc are adapted to provide a staggered overscan scanning pattern.

31. The rangefinder scanner of claim 30 wherein every other scanning disc reflector is shifted by a distance equal to one pixel in order to optically perform said staggered overscan.

32. The rangefinder scanner of claim 25 being contained in a package wherein said primary mirror, rotating scanning disc and collection optic have a relatively long focal length as compared to said package size.

33. The rangefinder scanner of claim 32 wherein said focal length is on the order of about 0.75 meters, and package size of said rangefinder scanner is 0.001 cubic meters approximate.

34. The rangefinder scanner of claim 25 further comprising retroflector means associated with a target to be ranged.

35. The rangefinder scanner of claim 34 wherein said retroflector means comprise at least one cube corner reflector.

36. The rangefinder scanner of claim 30 further comprising threshold means for rejecting detector signals below a predetermined value.

37. A rangefinder method comprising the steps of:
providing a rangefinder scanner having transmission means for transmitting a light pulse toward a pixel in a scene and receiving channel means for receiving and detecting said light pulse reflected from a target, said receiving channel means including rotating scanning disc and detector;
activating said transmission means to emit a light pulse toward a pixel in the scene;
querying said detector for at least one range interval subsequent to transmission of said light pulse to detect said pulse reflected from a target in the scene; and
determining the range of the target based upon the elapsed time between transmission of said pulse and detection of said reflected pulse.

38. The rangefinder method of claim 37 further comprising the step of determining said elapsed time based upon speed of rotation of said rotating scanning disc.

39. A collision avoidance method comprising the steps of:
providing a rangefinder scanner associated with a vehicle for scanning a scene, said rangefinder scanner including framing mirror, primary mirror, strip mirror, rotating scanning disc having a plurality of concave reflectors disposed thereon, collection optic, detector, and light pulse transmitter, said framing mirror conducting a linear scan of the scene in a first direction, said primary mirror focusing said linear scan onto said strip mirror, said concave scanning disc reflectors scanning said linear image from said strip mirror in a second direction, said collection optic focusing said scanned image onto said detector;
transmitting a pulse of light toward a pixel of the scene;
querying said detector for at least one range interval subsequent to transmission of said pulse in order to detect said light pulse reflected from a target in the scene;
determining the optical displacement between the time zero transmission of said pulse and detection of said reflected pulse;
determining the range of the target based upon said optical displacement and the speed of rotation of said scanning disc;
determining the angle of the target based upon the position of the ranged pixel in the scene;
determining from said range and angle data separation distance and predicted separation distance at time of intercept of said vehicle and said target; and
emitting a collision warning in the event the predicted separation distance is below a predetermined minimum value.

40. The method of claim 39 further comprising the step of effecting collision avoidance maneuvers in response to said collision warning.

41. The method of claim 39 wherein said step of determining the range of the target further comprises the step of determining the range, R, from the equation:

$$D = \frac{\pi}{45} f_s \omega_{rpm} \cdot R \times 10^{-8} \text{ meters}$$

where:
D = displacement distance along the detector array between transmission of said pulse and detection of said reflected pulse,
$f_s$ = receiving channel focal length, and $\omega$rpm. = angular rate rotation of said scanning disc.

42. The method of claim 39 further comprising the step of conducting multiple ranging scans of the scene.

43. The method of claim 42 wherein said step of determining predicted separation distance comprises solving the equation $$W_p = W_o + \dot{W}t_i + \tfrac{1}{2}\ddot{W}t_i$$

where:
- $W_o$ = separation of the first vehicle and target at the instant the range and angle data were taken,
- $\dot{W}$ = rate of change of separation between the vehicles;
- $\ddot{W}$ = rate of change of $\dot{W}$; and
- $t_i$ = time to intercept.

44. The method of claim 42 wherein said step of determining the range of the target further comprises conducting a staggered overscan of the scene.

45. The method of claim 39 further comprising the step of providing a retroreflector associated with a target.

46. A collision avoidance system associated with a subject vehicle for detecting and tracking at least one target and predicting the separation distance between the subject vehicle and each target at the time of intercept, the system operating under all variety of road geometries, vehicle speeds and traffic fields encountered in ordinary driving situations, the system comprising:

rangefinder scanner means mounted to the subject vehicle for determining the range and angle of each target, said rangefinder scanner means having a high pixel range rate, a relatively wide field of view, and high spatial resolution;

processor means for tracking target range and angle, said processor means predicting time of intercept of said target, and calculating the rate of change of separation distance of said target and said first vehicle, calculating the acceleration of said separation distance, and predicting the separation distance between said target and the subject vehicle at said predicted time of intercept, said processor means emitting a collision warning in the event said predicted separation distance is less than a predetermined value.

47. The system of claim 46 wherein said pixel range rate is approximately 300,000 hertz.

48. The system of claim 46 wherein said rangefinder scanner means has a spatial resolution on the order of about 0.25 degrees × 0.25 degrees.

49. The system of claim 46 wherein said rangefinder scanner means has a frame rate of about 60 hertz.

50. The system of claim 46 wherein said rangefinder scanner means has field of view of about 60 degrees × 6 degrees.

51. The system of claim 46 further comprising retroreflector means associated with said target.

* * * * *